(12) United States Patent
Takagi

(10) Patent No.: US 11,196,887 B2
(45) Date of Patent: Dec. 7, 2021

(54) INFORMATION PROCESSING APPARATUS RECEIVING USER SELECTION AMONG PATTERNS TO CORRECT DOCUMENT AREAS AND NON-TRANSITORY COMPUTER READABLE MEDIUM STORING PROGRAM

(71) Applicant: FUJIFILM Business Innovation Corp., Tokyo (JP)

(72) Inventor: Arihito Takagi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/907,303

(22) Filed: Jun. 21, 2020

(65) Prior Publication Data
US 2021/0250461 A1 Aug. 12, 2021

(30) Foreign Application Priority Data
Feb. 10, 2020 (JP) .............................. JP2020-020638

(51) Int. Cl.
*G06F 15/02* (2006.01)
*H04N 1/00* (2006.01)

(52) U.S. Cl.
CPC ....... *H04N 1/00824* (2013.01); *H04N 1/0044* (2013.01); *H04N 1/00779* (2013.01); *H04N 1/00782* (2013.01)

(58) Field of Classification Search
CPC ............... H04N 1/00824; H04N 1/004; H04N 1/00779; H04N 1/00782
USPC ................................................. 358/1.1–1.18
See application file for complete search history.

(56) References Cited

U.S. PATENT DOCUMENTS

| 7,474,801 | B2 * | 1/2009 | Teo .................... | H04N 1/00132 358/1.18 |
| 2007/0013974 | A1 * | 1/2007 | Hattori ................. | H04N 1/3872 358/486 |
| 2008/0018951 | A1 | 1/2008 | Bannai | |
| 2012/0300264 | A1 * | 11/2012 | Okumura ........... | H04N 1/00461 358/448 |
| 2017/0155785 | A1 * | 6/2017 | Mizude .............. | H04N 1/00734 |
| 2017/0155792 | A1 * | 6/2017 | Mizude .............. | H04N 1/00748 |
| 2019/0149680 | A1 | 5/2019 | Ikeda et al. | |
| 2020/0028985 | A1 * | 1/2020 | Tagami ................ | H04N 1/3873 |
| 2020/0344362 | A1 * | 10/2020 | Miyamoto ......... | G06K 9/00463 |

FOREIGN PATENT DOCUMENTS

| JP | 4574503 | 11/2010 |
| JP | 2018201174 | 12/2018 |
| JP | 2019092065 | 6/2019 |

\* cited by examiner

*Primary Examiner* — Gabriel I Garcia
(74) *Attorney, Agent, or Firm* — JCIPRNET

(57) ABSTRACT

An information processing apparatus includes a processor configured to, in a case where there are plural patterns of document areas extracted from an input image obtained by imaging documents, execute display control for displaying the plural patterns as options on a screen, receive selection of a correct pattern among the plural patterns according to the display of the screen through the display control, and extract an image of each document area included in the pattern selected by a user from the input image.

20 Claims, 29 Drawing Sheets

FIG. 6

| PATTERN NUMBER | SCORE | NUMBER OF AREAS | AREA ID | AREA SHAPE |
|---|---|---|---|---|
| 1 | 0.90 | 2 | 1 | (x1,y1), (x2,y2), (x3,y3) |
| | | | 2 | (x4,y4), (x5,y5), (x6,y6) |
| 2 | 0.78 | 1 | 3 | (x1,y1), (x2,y2), (x6,y6) |

INFORMATION PROCESSING APPARATUS RECEIVING USER SELECTION AMONG PATTERNS TO CORRECT DOCUMENT AREAS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-020638 filed Feb. 10, 2020.

BACKGROUND

(i) Technical Field

The present invention relates to an information processing apparatus and a non-transitory computer readable medium storing a program.

(ii) Related Art

Among scanner apparatuses or multifunction machines (that is, apparatuses having functions of a scanner, a printer, a copying machine, and the like), there is known an apparatus that has a function of reading a plurality of documents placed on a document table called a platen and cutting and digitalizing an image of the individual document from read images. Such a function is referred to as a multi-crop function.

The apparatus of the related art increases contrast of a peripheral edge portion of a document and a background using a method of covering a plurality of documents placed on the document table with black background paper, or the like, thereby increasing accuracy of cutting of the image of the individual document.

However, an operation to cover the document group with the black background paper may be easily missed. A multifunction machine or the like includes a document cover (in many cases, including an internal automatic document feeder) that can be opened or closed with respect to a document table, and a surface of the document cover facing the document table is generally white. Ina case where an operation to cover a plurality of documents on the document table with the black background paper is missed, and the documents are read while the document cover is closed as normal, an image as a result of reading shows a state in which a plurality of white documents are arranged on a white background. In many cases, edges of the documents do not clearly appear in the image as a result of reading. In a case where the edges of the documents are not clear, the accuracy of cutting of an image of an individual document is deteriorated. For example, an error that a plurality of documents are cut as one large document, or the like may occur.

Even though the accuracy of cutting is increased using the black background paper or the like, an error may occur in cutting. For example, in a case where a plurality of documents are aligned and placed on the document table with no gap or in a state of overlapping a little one another, the multi-crop function may make a plurality of documents be cut as one document.

Among the apparatuses of the related art having the multi-crop function, there is known an apparatus having a function of presenting a cutting result to a user.

For example, an apparatus disclosed in JP4574503B detects an area of an individual document from an image obtained by pre-scanning an entire surface of a document table with low resolution, displays the detected area of the document, and then, execute main scanning (see the paragraphs 0025, 0061, and 0079 and FIG. 2 in JP4574503B).

JP2018-201174A and JP2019-092065A are examples of the related art relating to multi-crop.

SUMMARY

In a case where a document area extracted from an input image obtained by imaging documents are simply displayed, a user can just confirm whether or not the displayed document area is correct. In a case where the displayed document area is erroneous, the user performs, for example, an operation to replace the document on the document table and to make the apparatus read the document again, such that a correct document area is extracted; however, the operation is complicated for the user.

Aspects of non-limiting exemplary embodiments of the present disclosure relate to an information processing apparatus and a non-transitory computer readable medium storing a program that reduce a burden of operation on a user for extracting a correct document area compared to a system in which a document area extracted from an input image obtained by imaging documents is simply displayed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to, in a case where there are a plurality of patterns of document areas extracted from an input image obtained by imaging documents, execute display control for displaying the plurality of patterns as options on a screen, receive selection of a correct pattern among the plurality of patterns according to the display of the screen through the display control, and extract an image of each document area included in the pattern selected by a user from the input image.

BRIEF DESCRIPTION OF THE DRAWINGS

Exemplary embodiment(s) of the present invention will be described in detail based on the following figures, wherein:

FIG. 6 is a diagram showing an example of data indicating an extraction result of a pattern;

DETAILED DESCRIPTION

Example of Hardware Configuration

Figure 1:
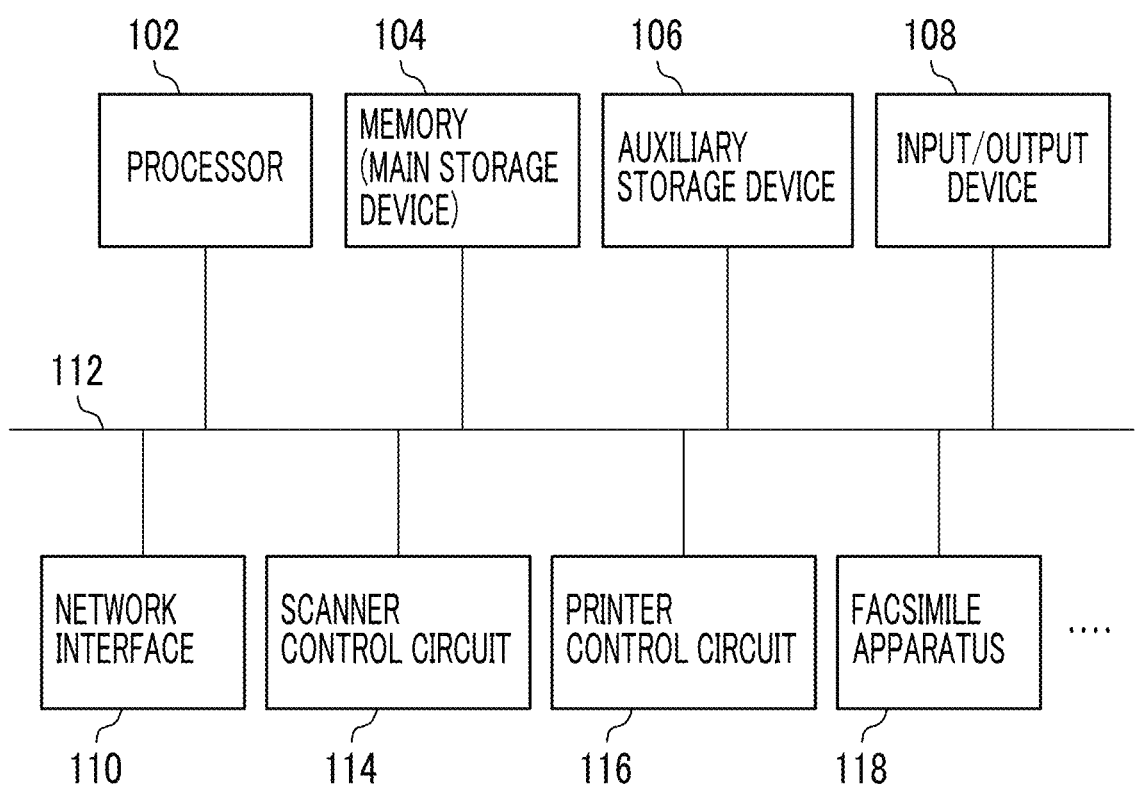
FIG. 1 is a diagram illustrating the hardware configuration of a computer including an information processing apparatus.

The hardware configuration of an information processing apparatus of an exemplary embodiment is shown in FIG. 1. The example shown in FIG. 1 is a case where the information processing apparatus is a so-called multifunction machine. The multifunction machine is an apparatus having functions of a printer, a scanner, a copying machine, a facsimile apparatus, and the like in combination. The multifunction machine may have a function of receiving a request from a client, such as a personal computer, by way of a network, such as a local area network, or performing communication with a server or the like on the Internet.

Figure 2:
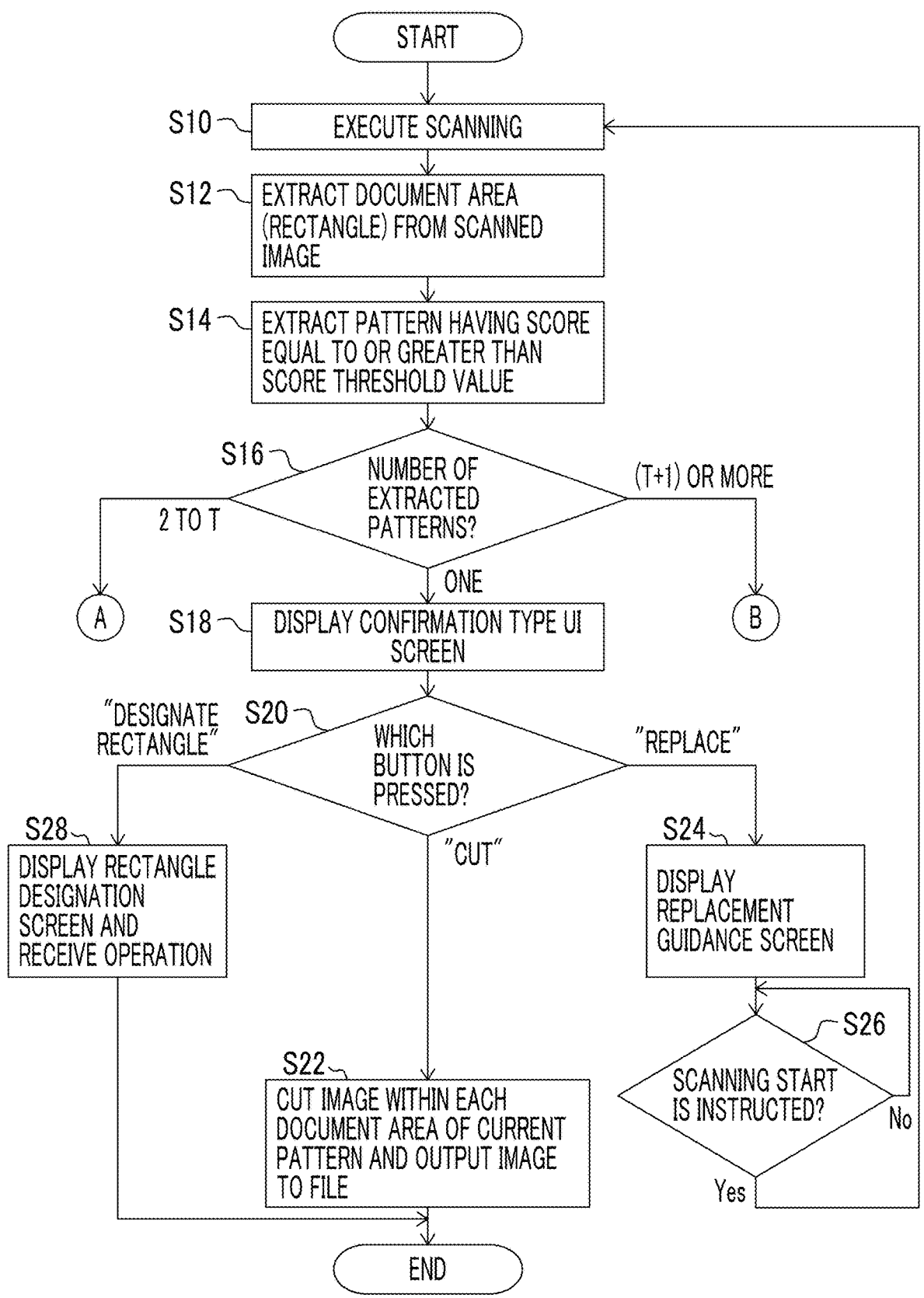
FIG. 2 is a diagram illustrating a part of a processing procedure that is executed by a processor of the information processing apparatus.

The information processing apparatus has, for example, a circuit configuration in which, as shown in FIG. 2, a processor 102, a memory (main storage device) 104, such as a random access memory (RAM), a controller that controls an auxiliary storage device 106, which is a nonvolatile storage device, such as a flash memory, a solid state drive (SSD), or a hard disk drive (HDD), an interface for connection to various input/output devices 108, a network interface 110 that performs control for connection to a network, such as a local area network, and the like as hardware, are connected through, for example, a data transmission path, such as a bus 112. The input/output device 108 includes, for example, a combined display/input device, such as a touch panel, a sound output device, such as a speaker, a card reader for user authentication, and the like. The circuit configuration of the portions described above may be identical to the circuit configuration of a general-purpose computer.

The information processing apparatus includes a scanner control circuit 114, a printer control circuit 116, a facsimile apparatus 118, and the like connected to the computer portion through the bus 112 and the like. These are provided for various functions of the information processing apparatus (in the example, the multifunction machine). The scanner control circuit 114 is a circuit that controls a scanner or an automatic document feeder embedded in the multifunction machine, and the printer control circuit 116 is a circuit that controls a printer embedded in the multifunction machine. The facsimile apparatus 118 is a machine that carries a facsimile transmission and reception function of the multifunction machine.

The computer portion of the information processing apparatus executes processing for a user interface (UI), control of data exchange by way of the network, and information processing for control of various functional elements, such as a scanner, a printer, and a facsimile apparatus. A program in which the contents of various kinds of information processing are described is installed on the computer by way of the network or the like and is saved in the auxiliary storage device 106. The program stored in the auxiliary storage device 106 is executed by the processor 102 using the memory 104, whereby the information processing apparatus of the exemplary embodiment is implemented.

In the embodiments above, the term "processor 102" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor 102" is broad enough to encompass one processor 102 or plural processors 102 in collaboration which are located physically apart from each other but may work cooperatively. The order of operations of the processor 102 is not limited to one described in the embodiments above, and may be changed.

Processing of the exemplary embodiment is for an image captured by an imaging mechanism (for example, a scanner connected to the scanner control circuit 114) in the information processing apparatus. Accordingly, the information processing apparatus may not include the printer and the printer control circuit 116 that controls the printer, the facsimile apparatus 118, or the like. In the following description, although a case where the information processing apparatus is implemented as the multifunction machine will be described as a major example, this case is just an example. The information processing apparatus may be an apparatus including an imaging mechanism, and may be, for example, a scanner apparatus, a kiosk terminal, a smartphone, a tablet terminal, a personal computer, or the like.

Example of Extraction Processing of Document Image

Hereinafter, an example of processing for extracting a document image from a scanned image obtained through scanning processing with a scanner will be described referring to flowcharts of FIGS. 2 to 5.

The processing is started in a case where the user places one or more documents on a platen (that is, a document table) of a scanner attached to the information processing apparatus and instructs the information processing apparatus to start execution of "multi-crop" processing. Examples of a document to be a target of multi-crop include a business card, a receipt, and the like (but are not limited thereto).

In the processing, as illustrated in FIG. 2, the processor 102 first makes the scanner execute scanning through the scanner control circuit 114 (S10). With this, the processor 102 acquires an image (hereinafter, referred to as a scanned image) as a result of scanning the entire surface of the platen.

Next, the processor 102 extracts one or more document areas included in the scanned image from the scanned image (S12). A document area is an area of an image (that is, a document image) of a document placed on the platen in the scanned image. For example, in a case where a document is a receipt, an area indicating an image of the receipt is a document area. The scanned image is an image in which one or more document images are arranged within an image (for example, an image of a cover that covers the platen) of a background, and in S12, an area of a document image, that is, a document area is extracted from the scanned image. In general, since a document is a rectangle in many cases, in the following description, a document area is also referred to as a "rectangle" or a "rectangular area".

Extraction of a document area in S12 is performed using a known technique in the related art. As such a technique, for example, there is known a system that obtains an individual document area based on an edge extracted from a scanned image through edge extraction processing.

In the document area extraction processing of S12, there are often several possibilities regarding to a document area obtained from an edge or the like. For example, in an example shown in FIG. 9, two rectangular documents 12 having an identical width are placed on a platen 10 are arranged close to each other such that both sides are aligned on an identical straight line. In a case where the document area extraction processing is executed on a scanned image obtained by scanning this state, not only a pattern having two document areas corresponding to the two documents 12 but also a pattern regarding the two documents 12 as one continuous document area may be recognized. In a case where a boundary between the two documents 12 does not distinctly appear on the scanned image, there is a high possibility that the latter pattern is recognized. Accordingly, in the document area extraction processing, for a pattern of a document area recognized from a scanned image, a score indicating the probability of the pattern is computed. In the computation processing of the score, a method that is used in the multi-crop processing of the related art should be used. In the multi-crop processing of the related art, a pattern of which the score is a highest value is automatically selected, and an image of each document area indicated by the pattern is extracted and output.

In contrast, in the exemplary embodiment, while the pattern having the highest score is not automatically selected, in a case where there are a plurality of patterns having a high score to some extent, a plurality of patterns are presented to the user, and the user is prompted to select a correct pattern.

FIG. 6 illustrates extraction result data of patterns created in the memory 104 by the processor 102 as a result of the processing of S12. The extraction result data of this example includes information regarding a pattern number, a score, the number of areas, an area ID, and an area shape for each pattern. The pattern number is a consecutive number of a pattern. The score is the score described above. The number of areas is the number of document areas included in the pattern, and is referred to in determination of S16 described below. The area ID is identification information of each document area extracted in S12. The area shape is information for defining a rectangular shape of the document area indicated by the corresponding area ID. In the example shown in the drawing, information regarding the rectangular shape is a set of coordinates of three vertexes of the rectangular shape. The extraction result data shown in FIG. 6 corresponds to an extraction result shown in an example of FIG. 10 described below. An illustrated pattern of a pattern number 1 is a pattern including two document areas with the area ID is 1 and 2. Though not included in the example shown in FIG. 6, an identical document area may belong to a plurality of different patterns.

The processor 102 extracts patterns having a score equal to or greater than a score threshold value determined in advance from among one or more patterns obtained in S12 (S14). In other words, since there is a considerably low possibility that a pattern having a score equal to or less than the score threshold value is a correct answer, the pattern is discarded at this stage.

Next, the processor 102 determines whether the number of patterns extracted in S14 is one, equal to or greater than two and equal to or less than T (where T is an integer equal to or greater than two), or equal to or greater than (T+1) (S16).

Figure 7:
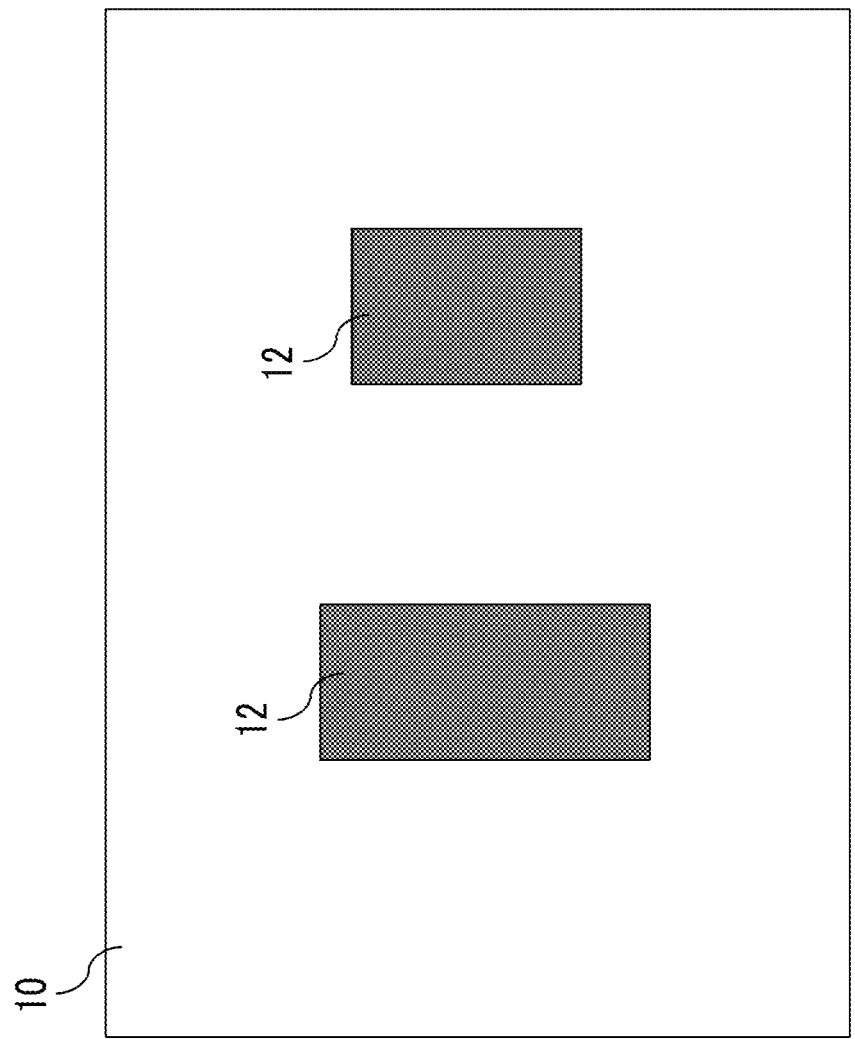
FIG. 7 is a diagram showing an example of arrangement of a document group on a platen.

Processing in a case where a determination result of S16 is "one" will be described also referring to FIGS. 7 and 8. FIG. 7 shows a state in which two documents 12 are placed on a platen 10 of a scanner mechanism in the information processing apparatus at a sufficient distance from each other. In a case where the individual documents 12 are arranged at a sufficient distance, the document areas of all documents 12 are accurately extracted through the processing of S12, and the patterns of the document areas having the score equal to or greater than the score threshold value are narrowed down to one pattern.

Figure 8:
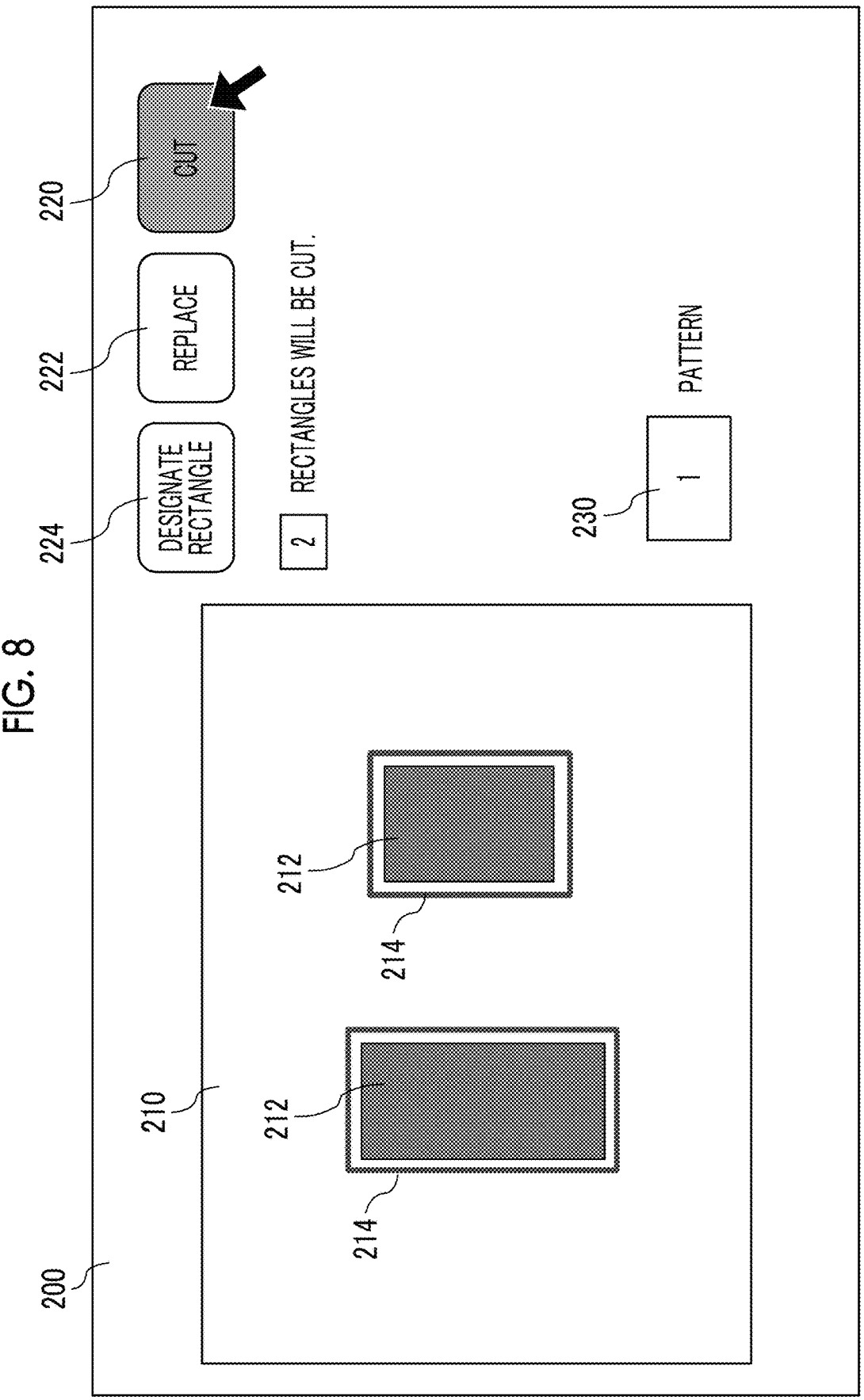
FIG. 8 is a diagram illustrating a confirmation type UI screen.

In a case where the determination result of S16 is "one" in this way, the processor 102 makes the display device as an example of the input/output device 108 display a UI screen 200 illustrated in FIG. 8 (S18). The UI screen 200 illustrated in FIG. 8 is referred to as a confirmation type UI screen. On the UI screen 200, a scanned image 210, a cut button 220, a replace button 222, a designate rectangle button 224, and a number-of-patterns display field 230 are displayed. The confirmation type UI screen displays only one obtained pattern and is used to prompt the user to confirm whether or not to extract (in the drawing, expressed as "cut" of a document image in compliance with the pattern.

In the scanned image 210, document images 212 that are images of the documents 12 placed on the platen 10 are included. In the scanned image 210, document areas 214 extracted in S12 are displayed. In the example shown in the drawing, each document area 214 is shown in a form of a frame line (in the example shown in the drawing, a rectangular frame line) surrounding the outer periphery of the document area. However, this is just an example. Instead, for example, an image in which an entire two-dimensional document area is filled with a specific color may be used as the document area 214.

In the number-of-patterns display field 230, the number of patterns of the document areas extracted from the scanned image 210 obtained in S10 is displayed. In the example of FIGS. 7 and 8, since the number of patterns to be probable to some extent (that is, have the score equal to or greater than the score threshold value) is only one, a value of "1" is displayed in the number-of-patterns display field 230.

The cut button 220 is a graphical user interface (GUI) component that receives an instruction to cut, that is, to extract the image of each document area 214 from the scanned image 210. For example, in a case where the display device in the information processing apparatus is configured as a touch panel, the user touches the cut button 220 displayed on the touch panel with a finger to press the cut button 220. An arrow shown to overlap the cut button 220 of FIG. 8 indicates that the cut button 220 is selected as a target to be pressed.

The replace button 222 is pressed in a case where the user replaces the group of the documents 12 on the platen 10 and resumes scanning.

The designate rectangle button 224 is pressed in a case where the patterns of the document areas extracted in S12 are discarded and the user manually designates a document area (in this example, "rectangle").

The processor 102 displays the UI screen 200 in S18, and determines which of the cut button 220, the replace button 222, and the designate rectangle button 224 the user presses (S20).

In a case where the user presses the cut button 220, the processor 102 extracts an image within each document area 214 indicated by the single pattern displayed on the displayed UI screen 200 and outputs each extracted image as a document image to a file (S22).

In a case where the user presses the replace button 222, the processor 102 makes the display device display a replacement guidance screen (S24), and waits until the user replaces the document and instructs scanning start in compliance with guidance of the replacement guidance screen (S26). A specific example of the replacement guidance screen will be described below referring to FIG. 26.

In a case where the user presses the designate rectangle button 224, the processor 102 makes the display device display a rectangle designation screen and receives designation of a rectangle of a document area on the screen from the user (S28). A specific example of the rectangle designation screen or the processing of S28 will be described below referring to FIGS. 27 to 29.

Figure 3:
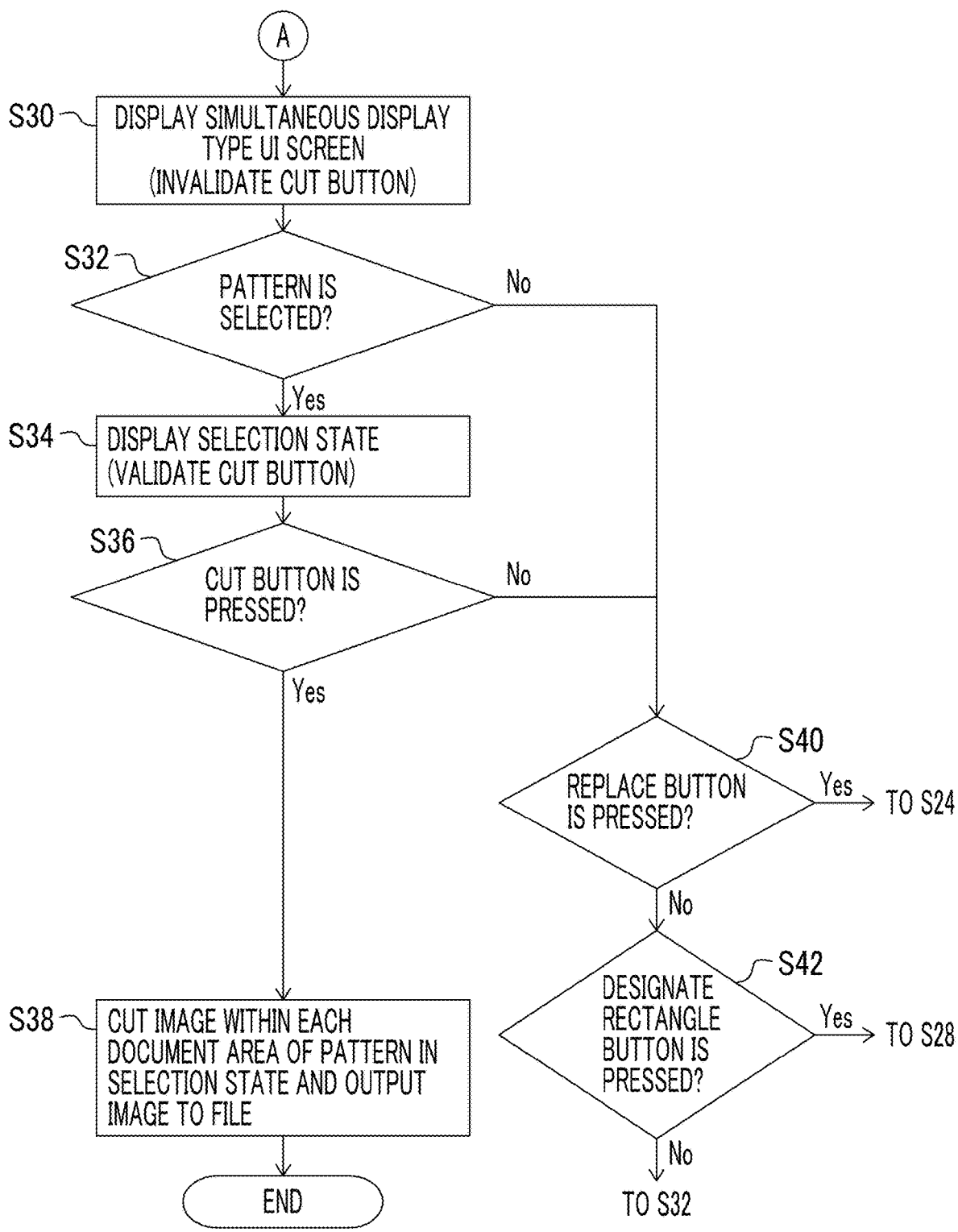
FIG. 3 is a diagram illustrating a part of the processing procedure that is executed by the processor of the information processing apparatus.

In a case where the determination result of S16 is "2 to T", processor 102 progresses a procedure shown in FIG. 3. In this case, the processor 102 makes the display device display a simultaneous display type UI screen (S30). The simultaneous display type UI screen is a screen on which patterns having the score extracted in S14 equal to or greater than the score threshold value are simultaneously displayed on one UI screen. In a case where too many patterns are displayed on one screen, an individual pattern is hardly distinguished with the human eye. Accordingly, in this example, in a case where an upper limit of the number of patterns that can be distinguished with the human eye even though the patterns are displayed on one screen is a threshold value T, and the number of patterns extracted in S14 is equal to or greater than two and equal to or less than T, the simultaneous display type UI screen is used.

Figure 9:
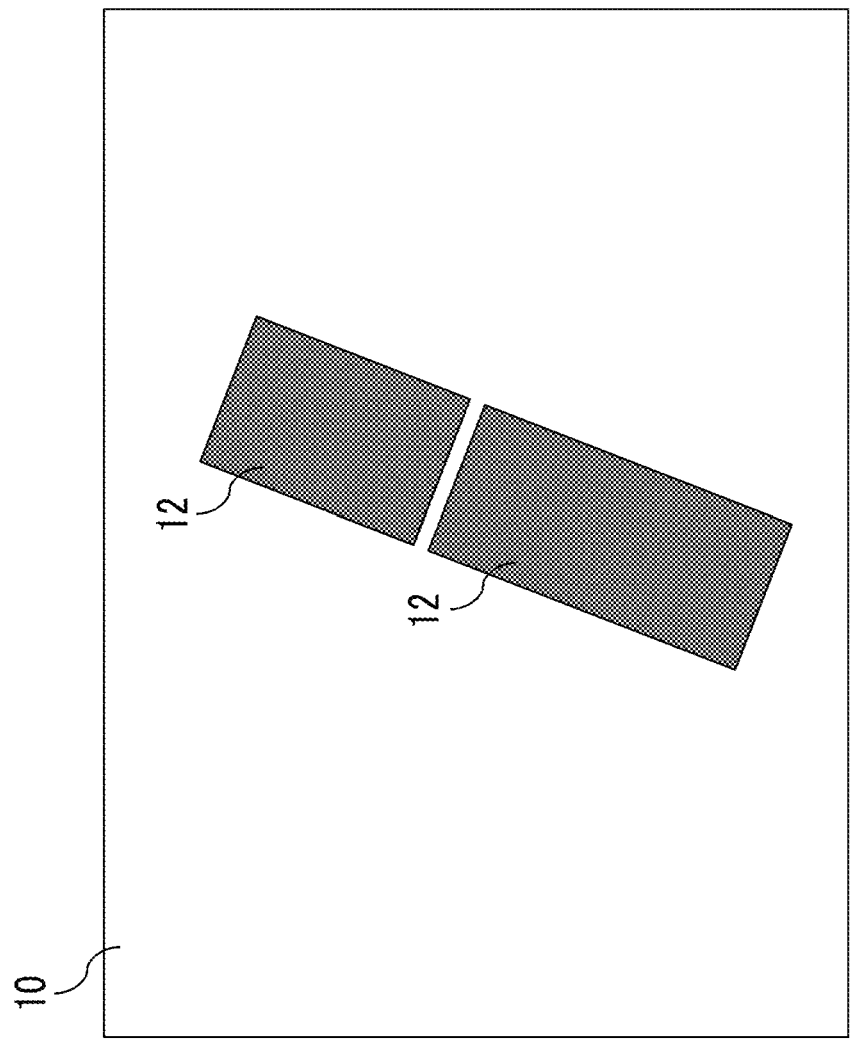
FIG. 9 is a diagram showing another example of arrangement of a document group on the platen.

In the example shown in FIG. 9, the two rectangular documents 12 having an identical width are arranged close each other on the platen 10 of the scanner such that both sides are aligned on an identical straight line. As simply described above, in this example, through the document area extraction processing, not only a pattern including two document areas corresponding to the two documents 12 but also a pattern regarding the two documents 12 as one continuous document area may be recognized.

Figure 10:
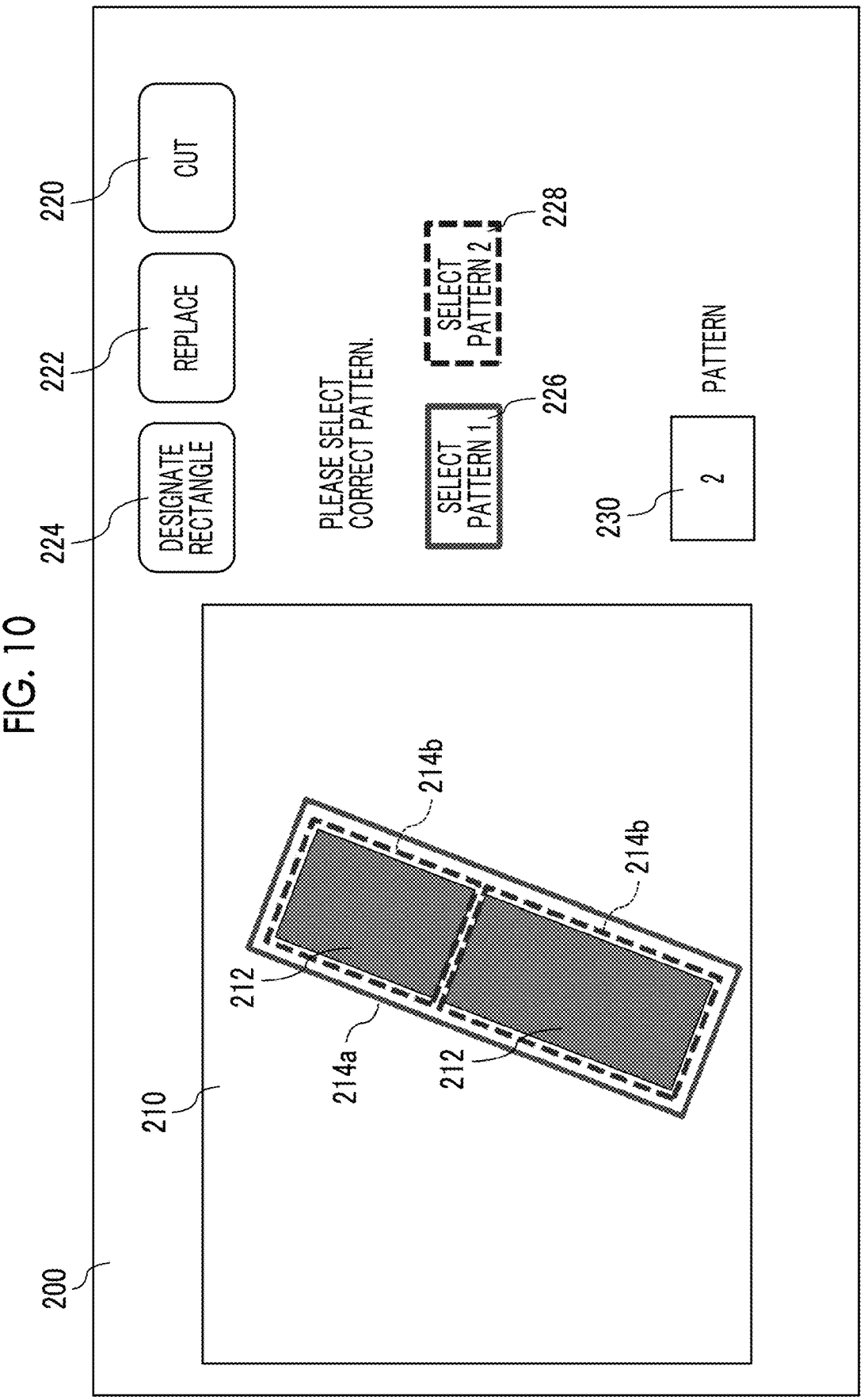
FIG. 10 is a diagram illustrating a simultaneous display type UI screen.

FIG. 10 illustrates a UI screen 200 (that is, the simultaneous display type UI screen) when the platen 10 in the state illustrated in FIG. 9 is scanned. In this example, a pattern 1 including one document area 214a, in which the two document images 212 are combined, and a pattern 2 including two rectangular document areas 214b substantially identical to the two document images 212 are simultaneously displayed on a scanned image 210 within the UI screen 200. The document area belonging to the pattern 1 and each document area belonging to the pattern 2 are displayed in different display forms so as to be distinguished from each other. In the example shown in the drawing, the document area 214a belonging to the pattern 1 is shown by a solid-line frame line of a first color, and each document area 214b belonging to the pattern 2 is shown by a broken-line frame line of a second color different from the first color.

In this example, the number of patterns recognized from the scanned image is two, and the number of patterns "2" is displayed in the number-of-patterns display field 230.

On the UI screen 200, a "select pattern 1" button 226 and a "select pattern 2" button 228 are displayed in addition to the cut button 220, the replace button 222, and the designate rectangle button 224 that are also present on the UI screen 200 of FIG. 8. The "select pattern 1" button 226 and the "select pattern 2" button 228 are GUI components that receive selection of the pattern 1 and the pattern 2 from the user, respectively. The "select pattern 1" button 226 is displayed in a display form corresponding to the display form of the document area 214a of the pattern 1 on the scanned image 210, and the "select pattern 2" button 228 is displayed in a display form corresponding to the display form of each document area 214b of the pattern 2. For example, the "select pattern 1" button 226 is displayed in a first color that is a display color of the document area 214a of the pattern 1, and the "select pattern 2" button 228 is displayed in a second color that is a display color of each document area 214b of the pattern 2.

In this way, on the illustrated UI screen 200, the display form of the document area of each pattern and the display form of the button for selecting each pattern are made to be identical or to correspond to each other. With this, the association of the patterns and the buttons are visually easily understood. Examples of the display form of the pattern and the corresponding button include a color or a line type (for example, a solid line, a broken line, or the like) of a frame line surrounding the document area or the button, the presence or absence of blinking, or the like, in addition to the color illustrated above.

In a case where there is a correct pattern among a plurality of patterns (in the example of FIG. 10, two) displayed on the UI screen 200, the user presses the button 226 or 228 corresponding to the correct pattern in compliance with a message "Please select correct pattern." on the UI screen 200.

In a case where an operation of the user on the UI screen 200 is detected, the processor 102 determines whether the operation is the press of the button 226 or 228 for selecting the pattern or an operation to press other buttons 220, 222, and 224 (S32). When the UI screen 200 of FIG. 10 is displayed, the user does not select any pattern from a plurality of patterns simultaneously displayed. For this reason, even though the cut button 220 is pressed, a pattern, with which a document image should be extracted, among a plurality of patterns is not understood. Accordingly, when the display of S30 is performed, the cut button 220 may be invalidated.

Figure 11:
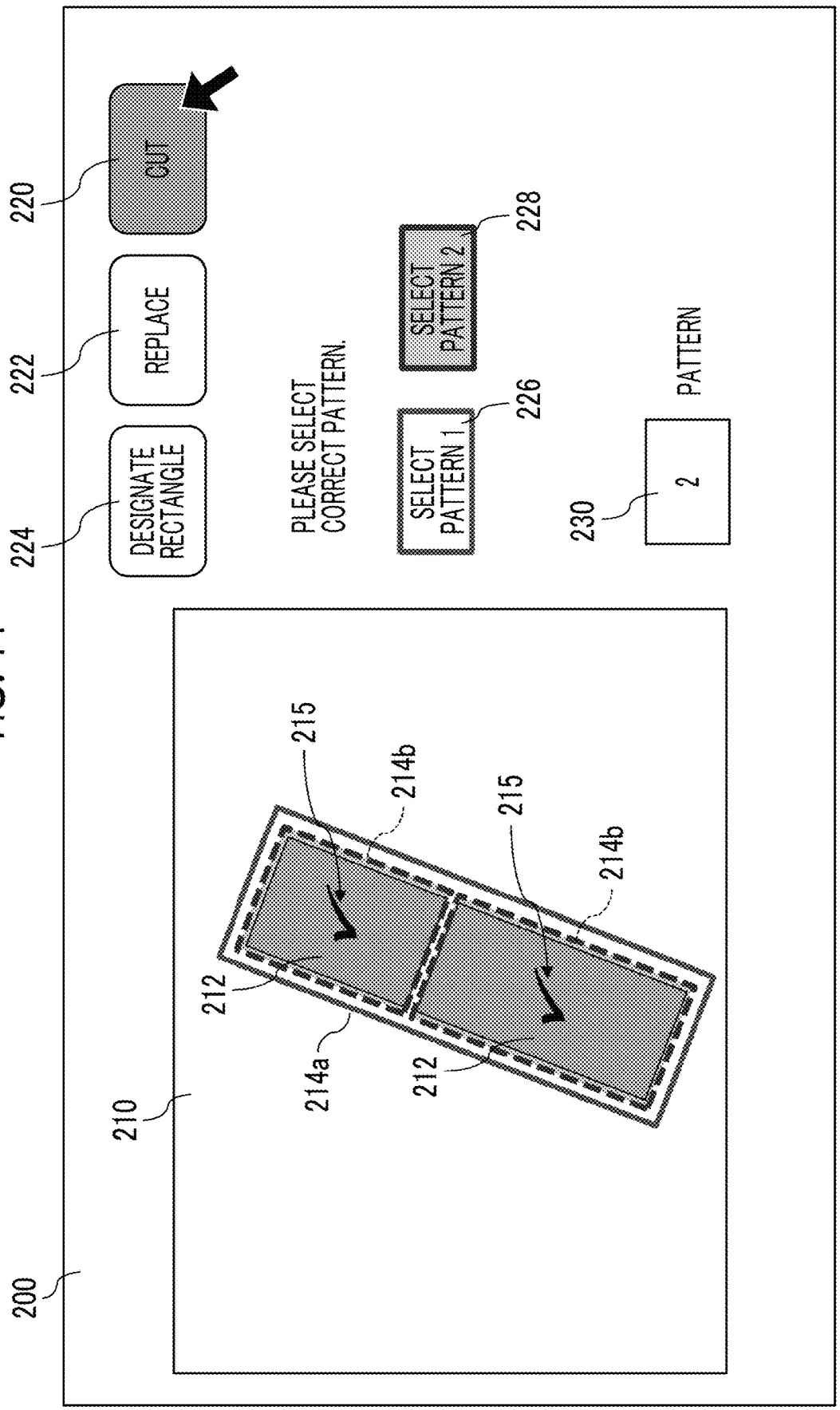
FIG. 11 is a diagram showing a state in which one pattern is selected on the simultaneous display type UI screen.

In a case where determination is made in S32 that the button 226 or 228 is pressed, the processor 102 displays each document area of the pattern corresponding to the pressed button 226 or 228 in a display form indicating a "selection state" (that is, a selected state) on the scanned image 210 (S34). A display example of the UI screen 200 in S34 is shown in FIG. 11. This example is an example of a case where the user presses the "select pattern 2" button 228. In this case, a check mark 215 is displayed on each of the two document areas 214b belonging to the pattern 2 within the scanned image 210. The check marks 215 indicate that the document areas 214b are in a selection state. At the stage of S34, since the user selects the pattern, the cut button 220 is validated (that is, made to transit to a state capable of being pressed). The selection state is also referred to as a state indicating that the user determines the document area as a correct document area.

Thereafter, the processor 102 waits for an operation from the user, that is, the press of the cut button 220, the replace button 222, the designate rectangle button 224, or the button 226 or 228 for selecting the pattern.

In a case where the operation of the user is detected, the processor 102 determines whether or not the operation is the press of the cut button 220 (S36). In a case where a result of the determination is Yes, the processor 102 cuts an image within each document area from the scanned image 210 in the selection state and outputs the image to a file (S38).

In a case where the determination result of S36 is No, the processor 102 determines whether or not the operation of the user is the press of the replace button 222 (S40), and in a case where a result of the determination is Yes, progresses to the processing of S24 of FIG. 2. In a case where the determination result of S40 is No, the processor 102 determines whether or not the operation of the user is the press of the designate rectangle button 224 (S42), and in a case where a result of the determination is Yes, progresses to the processing of S28 of FIG. 2. In a case where the determination result of S42 is No, the processor 102 progresses to S32, determines whether or not the operation of the user is the press of the button 226 or 228 for selecting the pattern, and then, executes the above-described processing.

Figure 4:
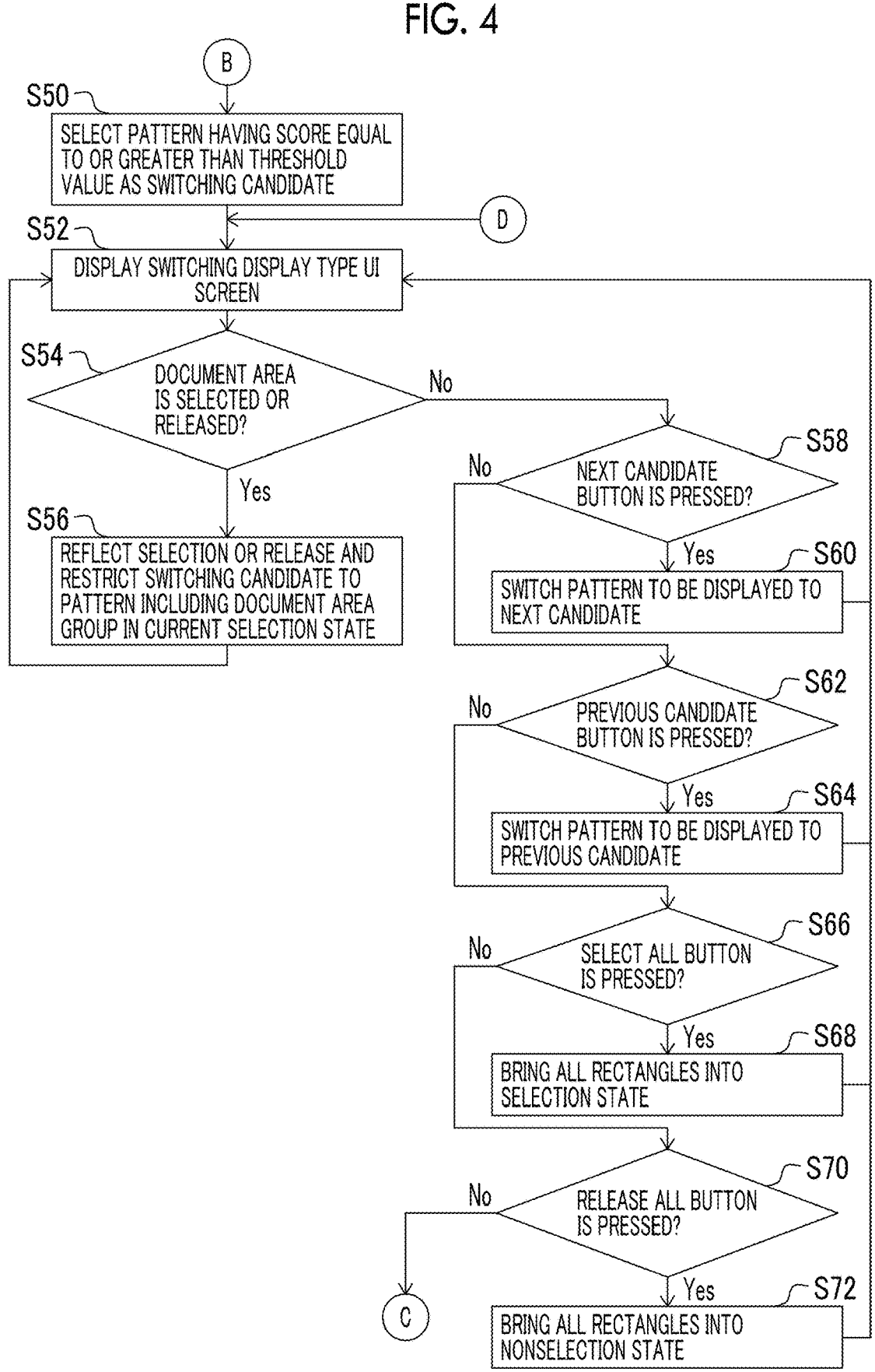
FIG. 4 is a diagram illustrating a part of the processing procedure that is executed by the processor of the information processing apparatus.

In a case where the determination result of S16 is "(T+1) or more", the processor 102 progresses to a procedure shown in FIG. 4. In the procedure of FIG. 4, an instruction from the user is received using a switching display type UI screen. In the following description, an example of a case of T=2 will be described as an example.

The switching display type UI screen is a screen on which only one pattern is displayed within the screen and the pattern to be displayed is sequentially switched by an operation of the user.

Figure 12:
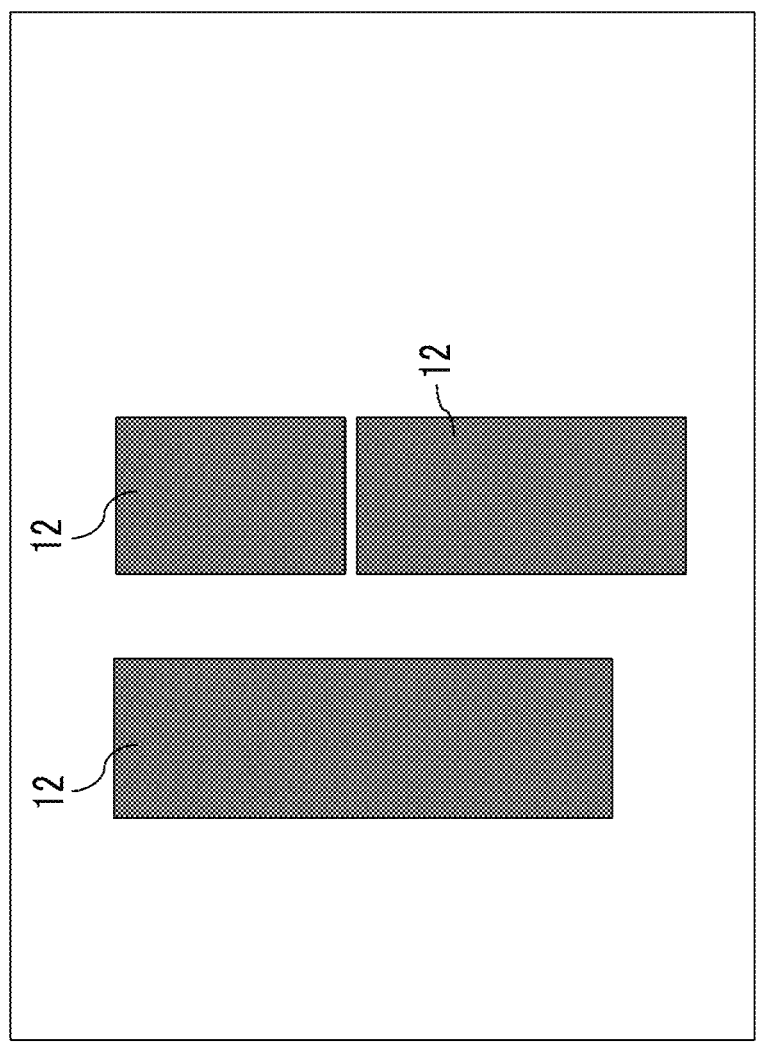
FIG. 12 is a diagram another example of arrangement of a document group on the platen.

In an example shown in FIG. 12, three documents 12 are arranged on the platen 10, and the two documents 12 on the right side are arranged close to each other such that both sides are aligned on an identical straight line. In this example, description will be given assuming that the number of patterns extracted in S14 of FIG. 2 is five. The five patterns may be attached with, for example, consecutive numbers in a descending order of the score.

Figure 13:
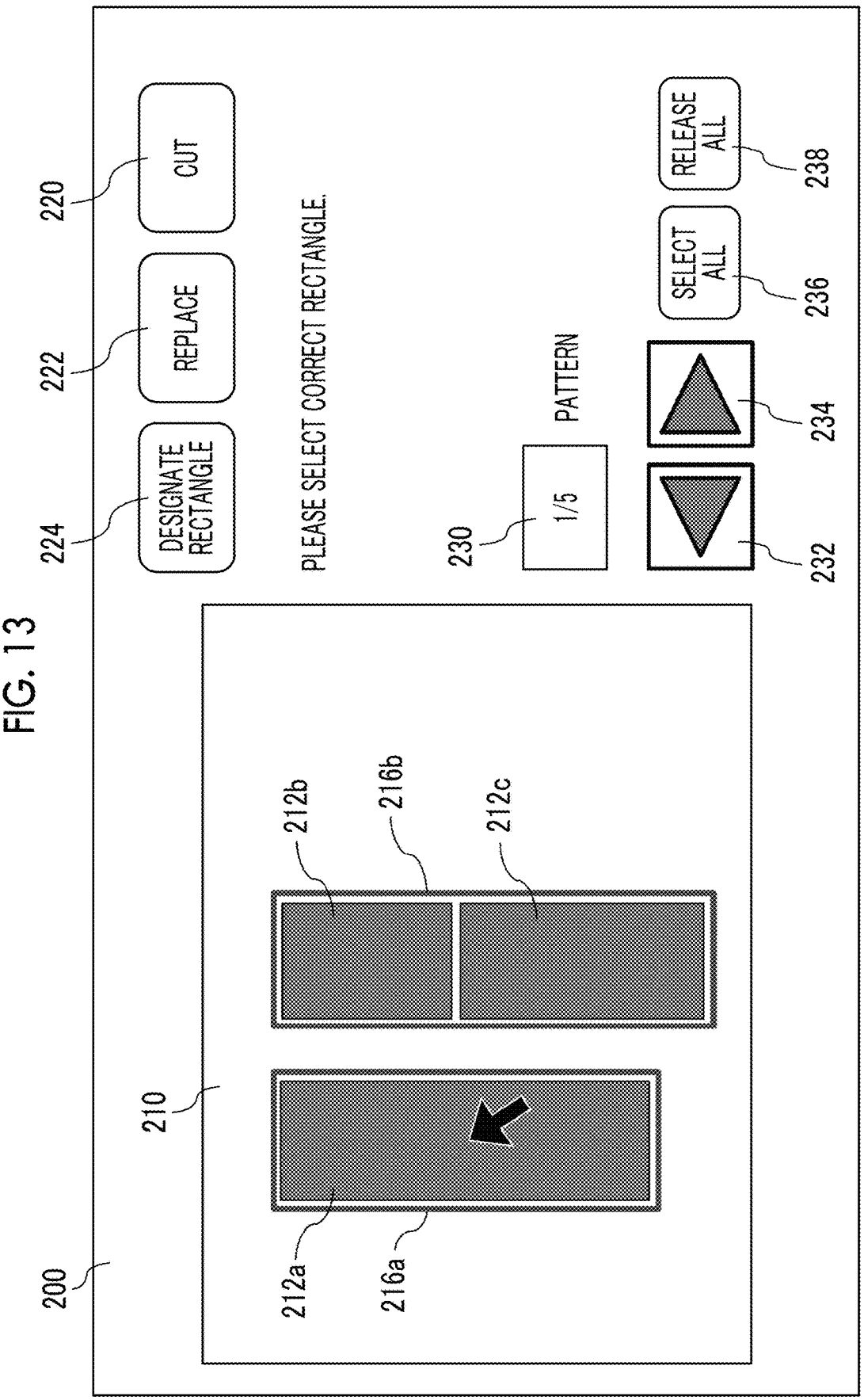
FIG. 13 is a diagram illustrating a switching display type UI screen.

FIG. 13 illustrates a UI screen 200 (that is, the switching display type UI screen) that is displayed when the platen 10 in the state illustrated in FIG. 12 is scanned. In this example, one (for example, one of which the score is the highest value) among the five patterns is displayed on a scanned image 210 within the UI screen 200. The pattern includes a document area 216a that covers a document image 212a on the left, and a document area 216b that continuously covers two document images 212b and 212c on the right.

The five patterns extracted in S14 are candidates of the patterns that are switched and displayed on the switching display type UI screen 200. The candidates are referred to as "switching candidates". "5" on the right side of "/" in a display content "⅕" within the number-of-patterns display field 230 indicates the total number of patterns of the switching candidates, and "1" on the left indicates a number (for example, the consecutive number described above) of the pattern being currently displayed among the five switching candidates.

On the switching display type UI screen 200, a previous candidate button 232, a next candidate button 234, a select all button 236, and a release all button 238 are displayed. The previous candidate button 232 is a button that receives an instruction to switch the pattern of the switching candidate displayed within the UI screen 200 to a previous switching candidate of the pattern being currently displayed. The next candidate button 234 is a button that receives an instruction to switch the pattern of the switching candidate displayed within the UI screen 200 to a subsequent switching candidate of the pattern being currently displayed. The select all button 236 is a button that receives an instruction to bring all document areas included in the pattern being currently displayed into the selection state, and the release all button 238 is a button that receives an instruction to release the selection state of all document areas included in the pattern being currently displayed.

On the UI screen 200, in a case where the user touches the document area 216a or 216b, the touched document area 216a or 216b transits to the selection state. That is, in a case where a correct document area closely fitted to a document image is found from among the document areas (that is, a rectangle) being displayed, the user touches the document area to select the document area. In a case where the document area 216a or 216b in the selection state is touched, the selection state of the touched document area 216a or 216b is released. With this, the document area 216a or 216b in the selection state transits to a nonselection state.

The description of the procedure of FIG. 4 will be continued. In a case where the determination result of S16 is "(T+1) or more", the processor 102 selects a pattern having the score equal to or greater than the score threshold value extracted in S14 as a switching candidate (S50). Next, the processor 102 makes the display device display the UI screen 200 illustrated in FIG. 13 (S52). At this point, both of the document areas 216a and 216b belonging to the pattern shown on the scanned image 210 are in the nonselection state.

In a case where an operation of the user on the UI screen 200 is received, the processor 102 determines whether or not the operation is an operation to given an instruction to select or release the rectangle, that is, the document area 216a or 216b (S54). In a case where a determination result of S54 is Yes, the processor 102 makes the state of the document area 216a or 216b transit to the selection state or the nonselection state according to the operation to select or release the document area 216a or 216b. In this case, the processor 102 narrows down the patterns of the switching candidates switched and displayed on the UI screen 200 with the press of the previous candidate button 232 or the next candidate button 234 only to the patterns including the document areas in the current selection state (S56).

Figure 14:
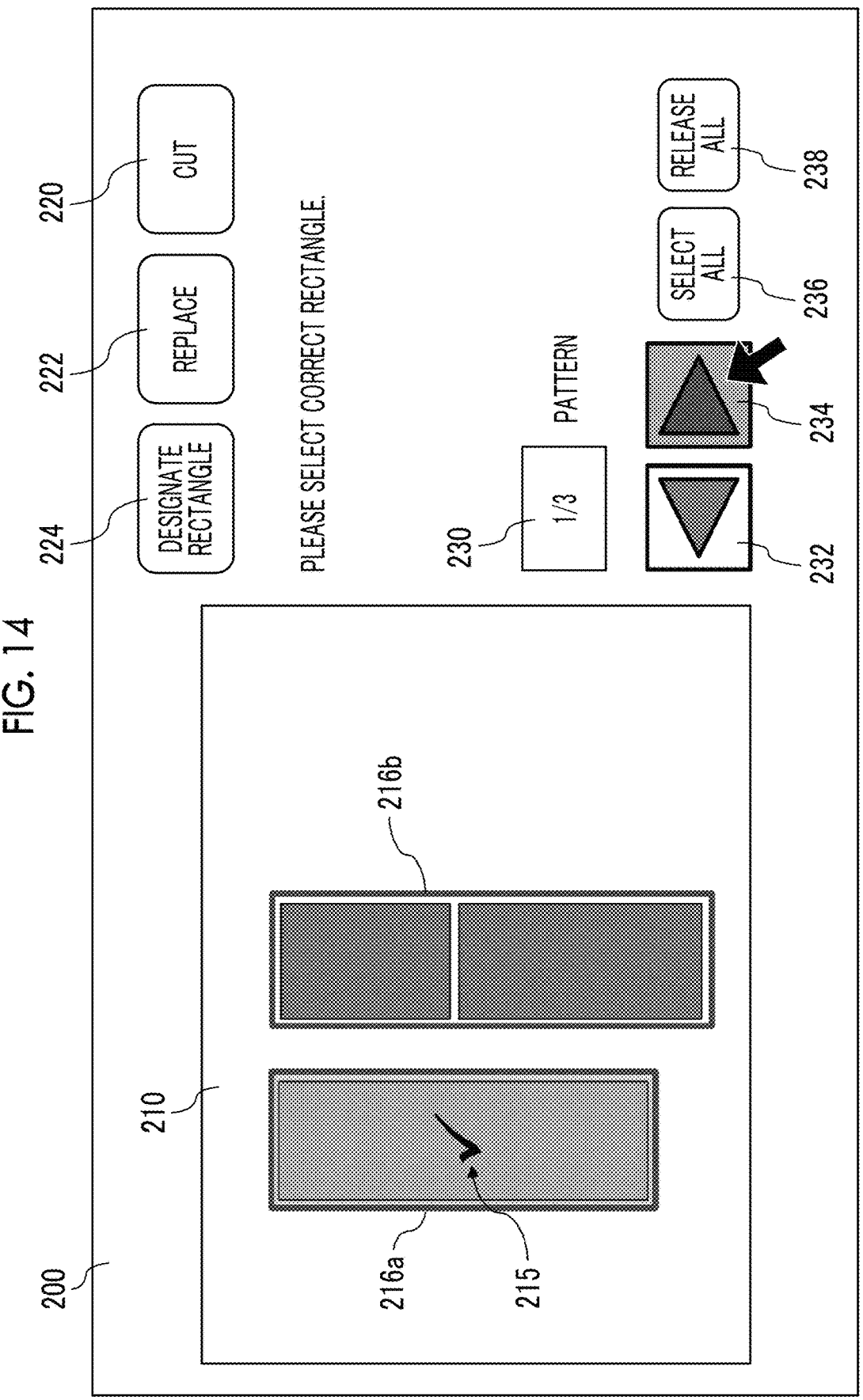
FIG. 14 is a diagram showing a state in which one document area is selected on the switching display type UI screen.

For example, on the UI screen 200 illustrated in FIG. 13, both of the document areas 216a and 216b are in the nonselection state; however, in a case where the user touches the document area 216a, as illustrated in FIG. 14, the document area 216a transits to the selection state. On a UI screen 200 illustrated in FIG. 14, a check mark 215 indicating that the document area 216a is in the selection state is displayed on the document area 216a within the scanned image 210. Although the number of switching candidates is five in the state of FIG. 13, with the selection of the document area 216a, the switching candidates are restricted to the patterns including the document area 216a. In the example shown in the drawing, the number of such patterns is three.

In a case where the determination result of S54 is No, the processor 102 determines whether or not the operation of the user is the press of the next candidate button 234 (S58). In a case where a result of the determination is Yes, the processor 102 switches the pattern displayed on the scanned image 210 to a next switching candidate (S60), and returns to S52.

Figure 15:
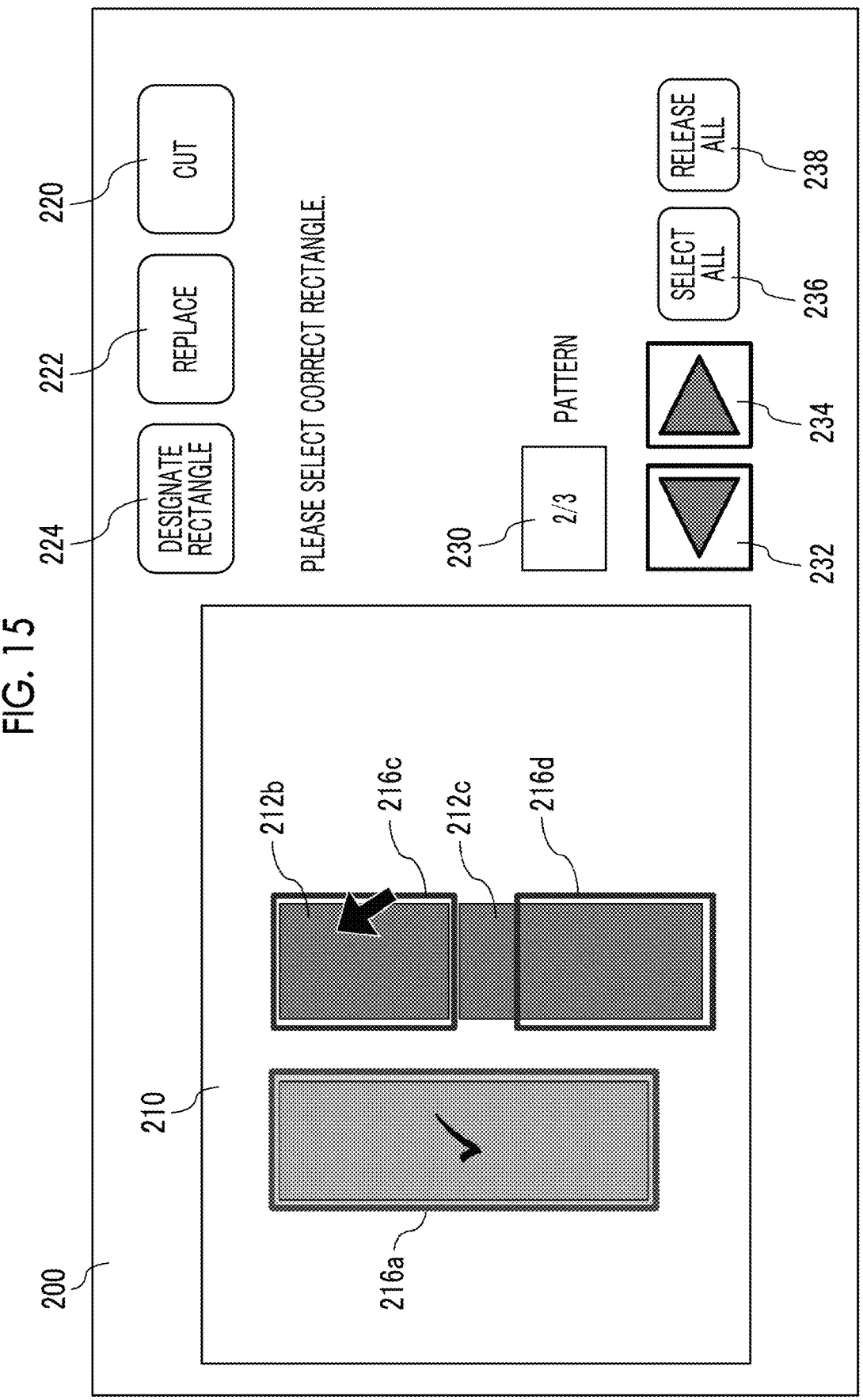
FIG. 15 is a diagram showing a state in which another pattern having one selected document area is displayed on the switching display type UI screen.

For example, in a case where the user presses the next candidate button 234 on the UI screen 200 illustrated in FIG. 14, as illustrated in FIG. 15, the pattern of the next switching candidate, that is, a second switching candidate is displayed on the scanned image 210. The pattern includes a document area 216c that closely covers the document image 212b and a document area 216d that covers a part below the document image 212c, in addition to the document area 216a in the selection state. The document area 216d is considered to be, for example, a result of erroneous detection that there is an edge in a portion corresponding to an upper end of the document area 216d due to a density distribution or the like within the document image 212c.

In a case where the determination result of S58 is No, the processor 102 determines whether or not the operation of the user is the press of the previous candidate button 232 (S62). In a case where a result of the determination is Yes, the processor 102 switches the pattern displayed on the scanned image 210 to a previous switching candidate (S64), and returns to S52.

In a case where the determination result of S62 is No, the processor 102 determines whether or not the operation of the user is the press of the select all button 236 (S66). In a case where a result of the determination is Yes, the processor 102 makes all rectangles belonging to the displayed pattern, that is, all document areas transit to the selection state (S68), and returns to S52. The processor 102 restricts the switching candidates only to the patterns including all document areas.

In a case where the determination result of S66 is No, the processor 102 determines whether or not the operation of the user is the press of the release all button 238 (S70). In a case where a result of the determination is Yes, the processor 102 makes all rectangles belonging to the displayed pattern, that is, all document areas transit to the nonselection state (S72), and returns to S52. The processor 102 returns a set of switching candidates to a set of switching candidates selected in S50.

Figure 5:
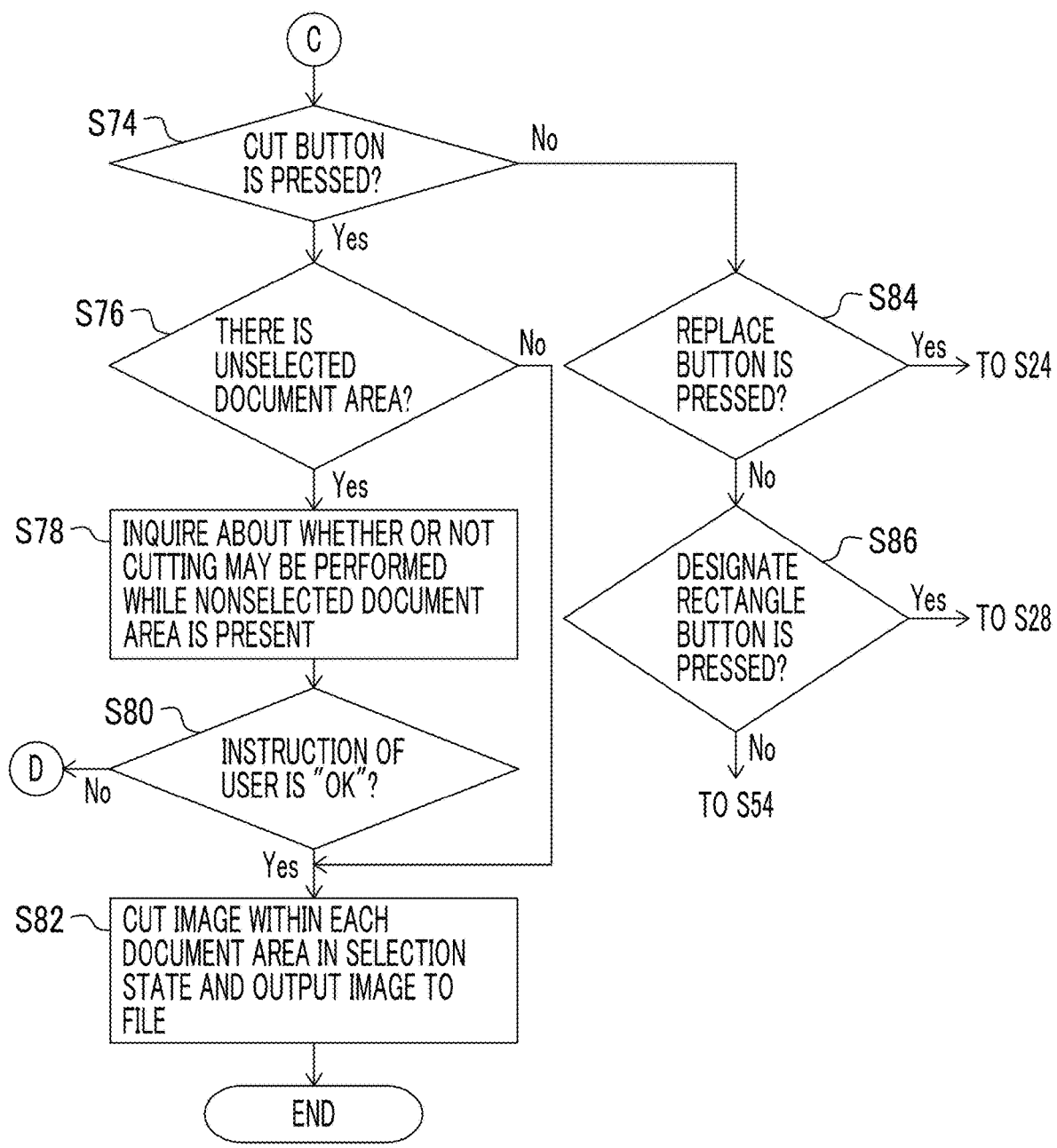
FIG. 5 is a diagram illustrating a part of the processing procedure that is executed by the processor of the information processing apparatus.

In a case where the determination result of S70 is No, as shown in FIG. 5, the processor 102 determines whether or not the operation of the user is the press of the cut button 220 (S74). In a case where a result of the determination is No, the processor 102 determines whether or not the operation of the user is the press of the replace button 222 (S84), and in a case where the result of the determination is Yes, the processor 102 progresses to the processing of S24 of FIG. 2. In a case where the determination result of S84 is No, the processor 102 determines whether or not the operation of the user is the press of the designate rectangle button 224 (S86), and in a case where a result of the determination is Yes, the processor 102 progresses to the processing of S28 of FIG. 2. In a case where the determination result of S86 is No, the processor 102 progresses to S54, determines whether or not the operation of the user is an operation to select or release the document area, and then, executes the above-described processing.

In a case where the determination result of S74 is Yes, the processor 102 determines whether or not there is the document area in the nonselection state among the document areas included in the displayed pattern (S76). In a case where a result of the determination is No (that is, in a case where all document areas within the pattern are in the selection state), the processor 102 extracts an image within each document area in the selection state from the scanned image 210 and outputs the image to a file (S82).

In a case where the determination result of S76 is Yes, in regard to the image of the document area in the nonselection state, the processor 102 displays, on the UI screen 200, a dialog including a warning to the effect that cutting, that is, extraction is not performed and an inquiry about whether or not cutting should be performed (S78). The processor 102 determines whether or not a reply input from the user to the dialog is "OK" (that is, cutting should be performed) (S80). In a case where a result of the determination is Yes, the image within each document area in the selection state is extracted from the scanned image 210 and is output to a file (S82). S78 and S80 are the processing that is provided in view of a case where there is a document area unnecessary for the user among the document areas extracted by the information processing apparatus. For example, in a case where an image occurs in a portion, in which a document is not present originally, due to a stain or the like of the platen 10, and the portion including the image us erroneously recognized as a document area, the image of the document area does not need to be extracted to begin with.

In a case where the determination result of S80 is No, the processor 102 returns to S52 to display the UI screen 200 and receives a further operation from the user.

Figure 16:
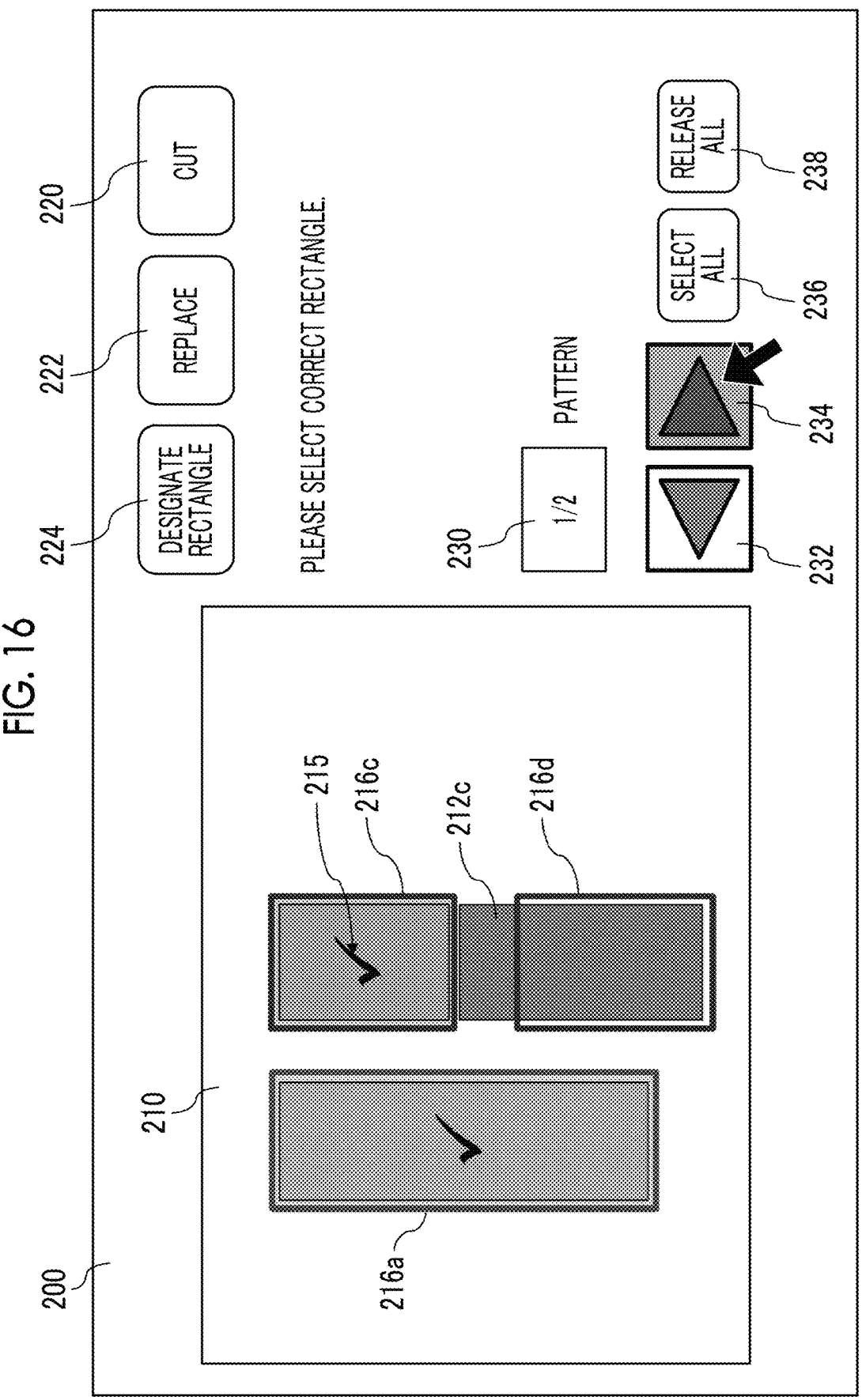
FIG. 16 is a diagram showing a state in which two document areas are selected on the switching display type UI screen.
Figure 17:
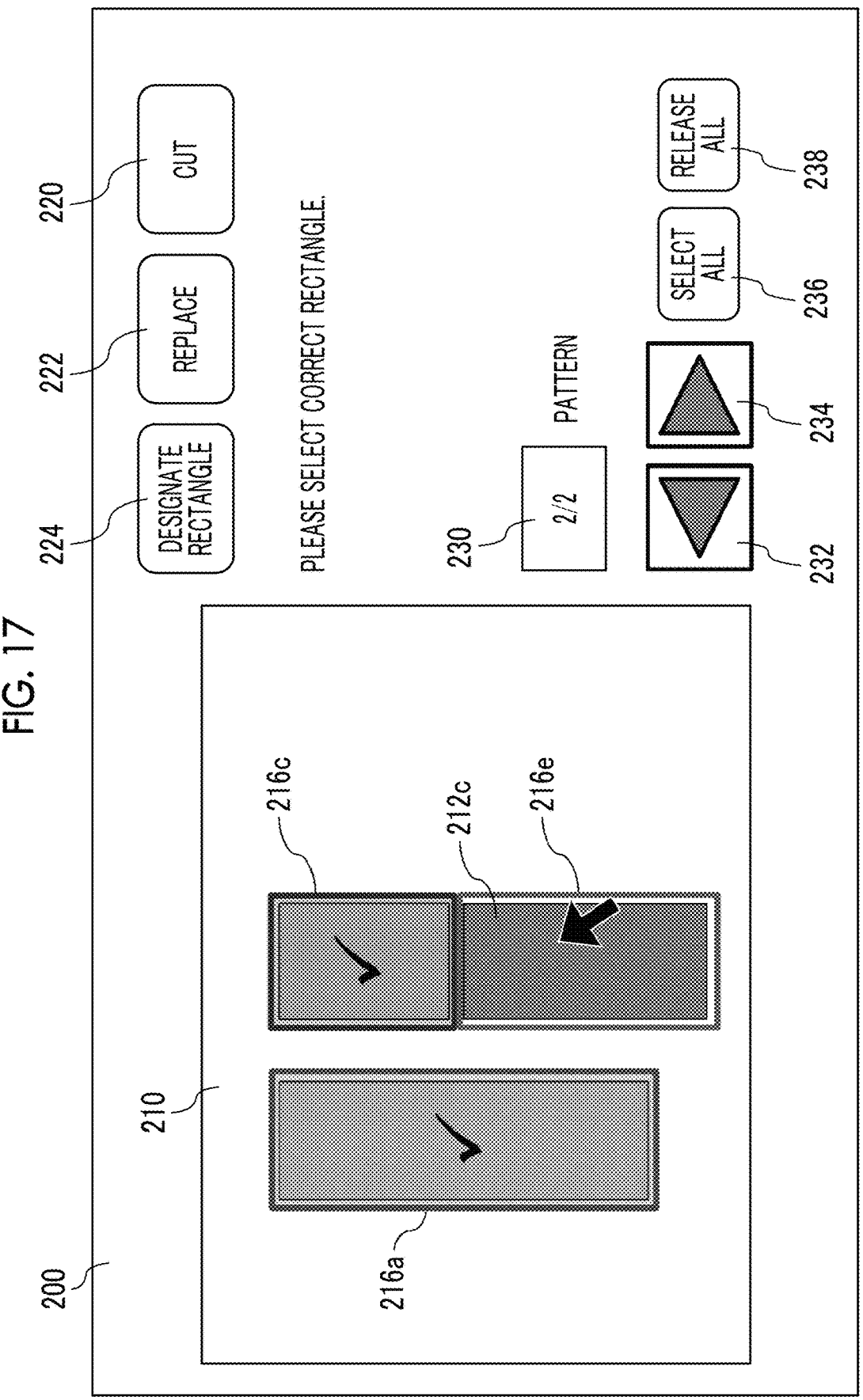
FIG. 17 is a diagram showing a state in which another pattern having two selected document areas is displayed on the switching display type UI screen.

In the processing of FIGS. 4 and 5, in a case where the user selects the document area 216c, for example, on a UI screen 200 shown in FIG. 15, as shown in FIG. 16, a check mark 215 indicating that the document area 216c is in the selection state is displayed on the document area 216c. As a result of the selection, the switching candidates are narrowed down to two patterns including the document areas 216a and 216c in the selection state. In a case where the user presses the next candidate button 234 on a UI screen 200 of FIG. 16, a pattern of a next switching candidate illustrated in FIG. 17 is displayed. The pattern includes a document area 216e that closely covers the document image 212c, in addition to the above-described document areas 216a and 216c.

Figure 18:
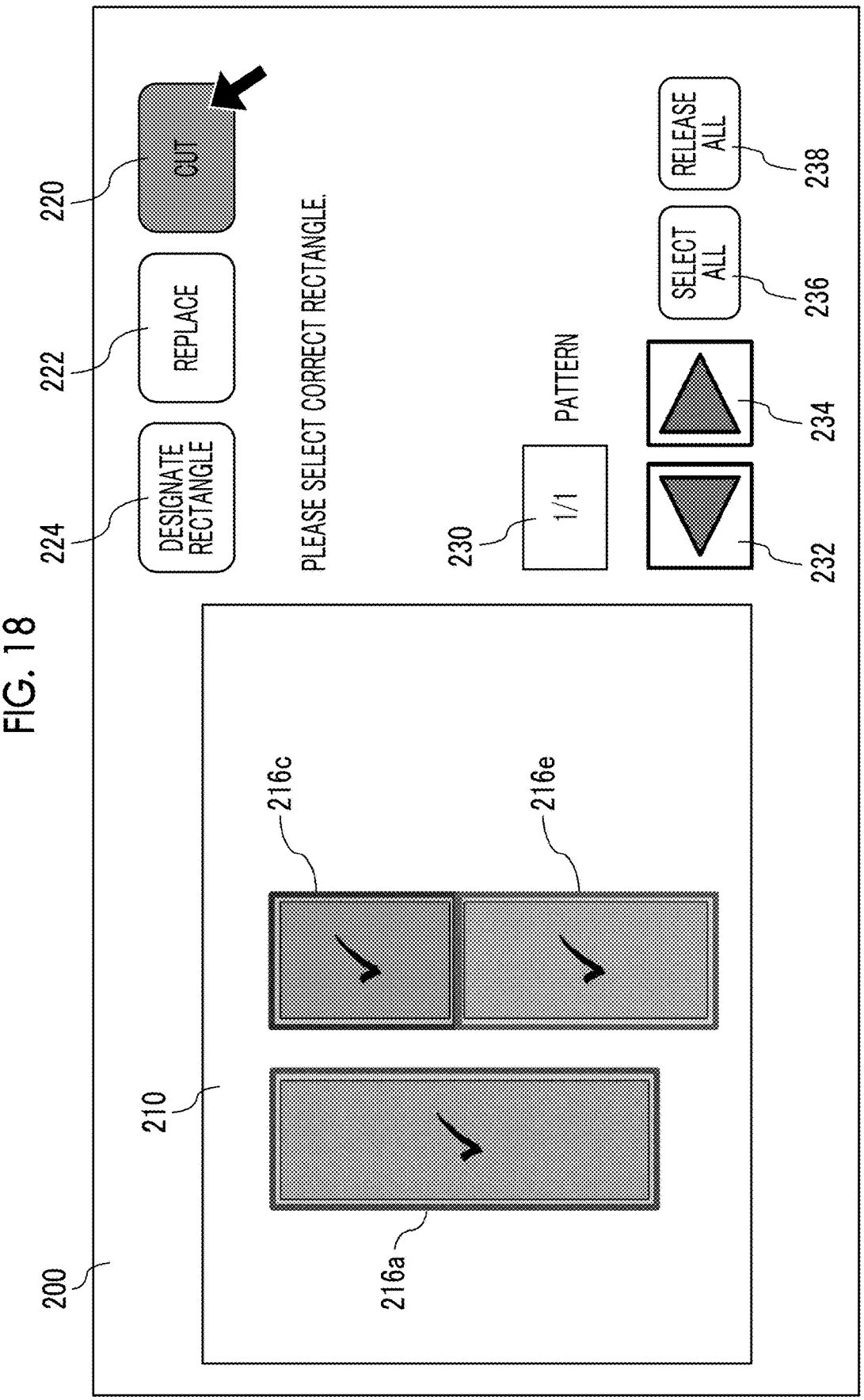
FIG. 18 is a diagram showing a state in which all document areas displayed on the switching display type UI screen are selected.

In a case where the user selects the document area 216e on a UI screen 200 of FIG. 17, as shown in FIG. 18, a check mark 215 indicating that the document area 216e is in the selection state is displayed on the document area 216e. Thereafter, in a case where the user presses the cut button 220, in S82, the processor 102 cuts the images of the document areas 216a, 216c, and 216e in the selection state and outputs the cut images to files, respectively.

In the example shown in FIGS. 12 to 18, the user selects a correct document area from the displayed pattern to narrow down the patterns of the switching candidates and finally reaches a correct pattern. However, in a case where number of patterns of switching candidates is small, the user presses the previous candidate button 232 or the next candidate button 234 to examine all patterns in order and to find a correct pattern, whereby much labor is not needed.

In the example shown in FIGS. 16 and 17, although the switching display type UI screen 200 is displayed even when the number of patterns of switching candidates is narrowed down to a sufficiently small number, such as two, this is just an example. As another example, the processor 102 may switch the UI screen 200 to be displayed to the simultaneously display type UI screen 200 (see FIG. 10) when the number of patterns of the switching candidates narrowed down becomes equal to or less than T as a result of selection of a document area group of the user. The document area group in the selection state is common among the patterns of the switching candidates remaining at this point. Accordingly, only in regard to the document area in the nonselection state, the display form may be distinguished between different patterns illustrated in FIG. 10.

Figure 19:
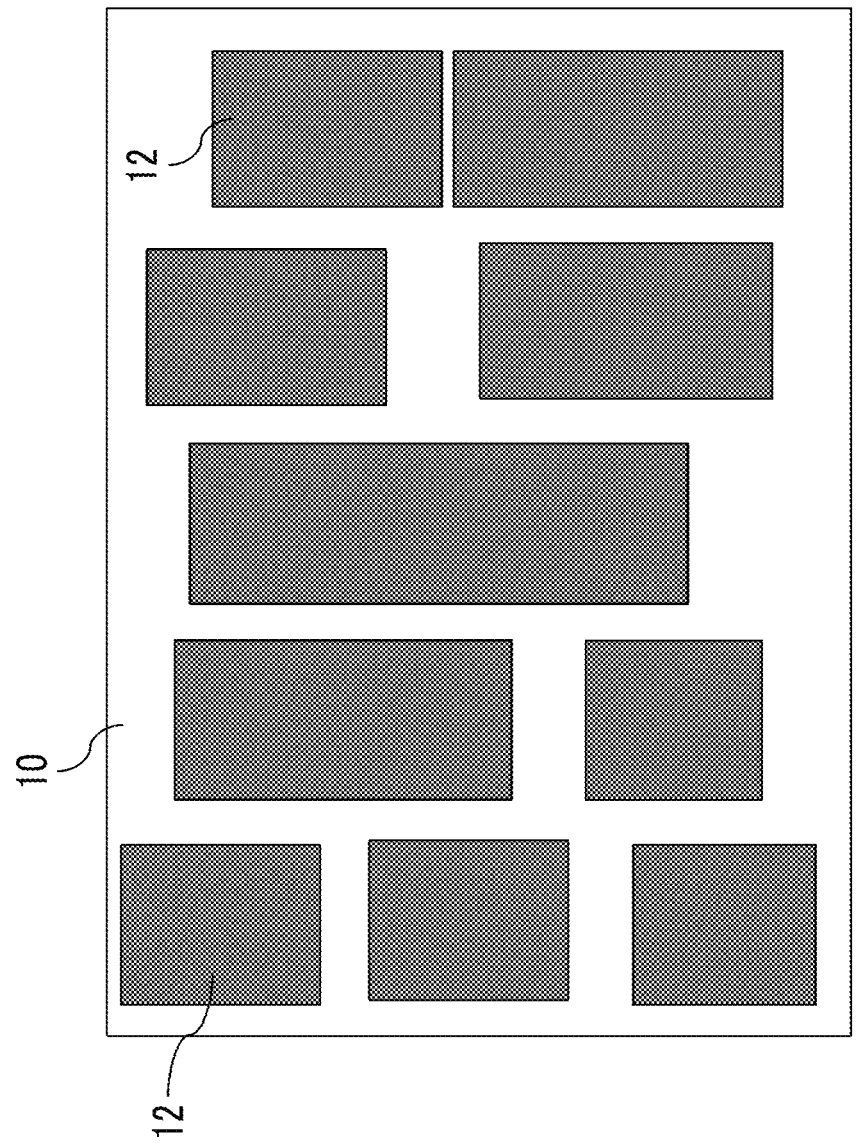
FIG. 19 is a diagram showing another example of arrangement of a document group on the platen.

Next, an example of a use scene of the select all button 236 will be described. As illustrated in FIG. 19, in a case where a large number of documents 12 are arranged on the platen 10 in a comparatively dense state, the number of patterns extracted in S14 may be extremely large. Description will be given assuming that the number of patterns is 15, and the UI screen 200 that is initially displayed after S50 of FIG. 4 is a UI screen 200 shown in FIG. 20. In a case where the number of documents or the number of switching candidates is large in this way, even though any of a method that examines all switching candidates in order using the next candidate button 234 or the like, and a method that selects a correct document area 218a and the like in order one by one and narrows down the switching candidates is applied, a time is needed for the user to reach a correct pattern.

Figure 20:
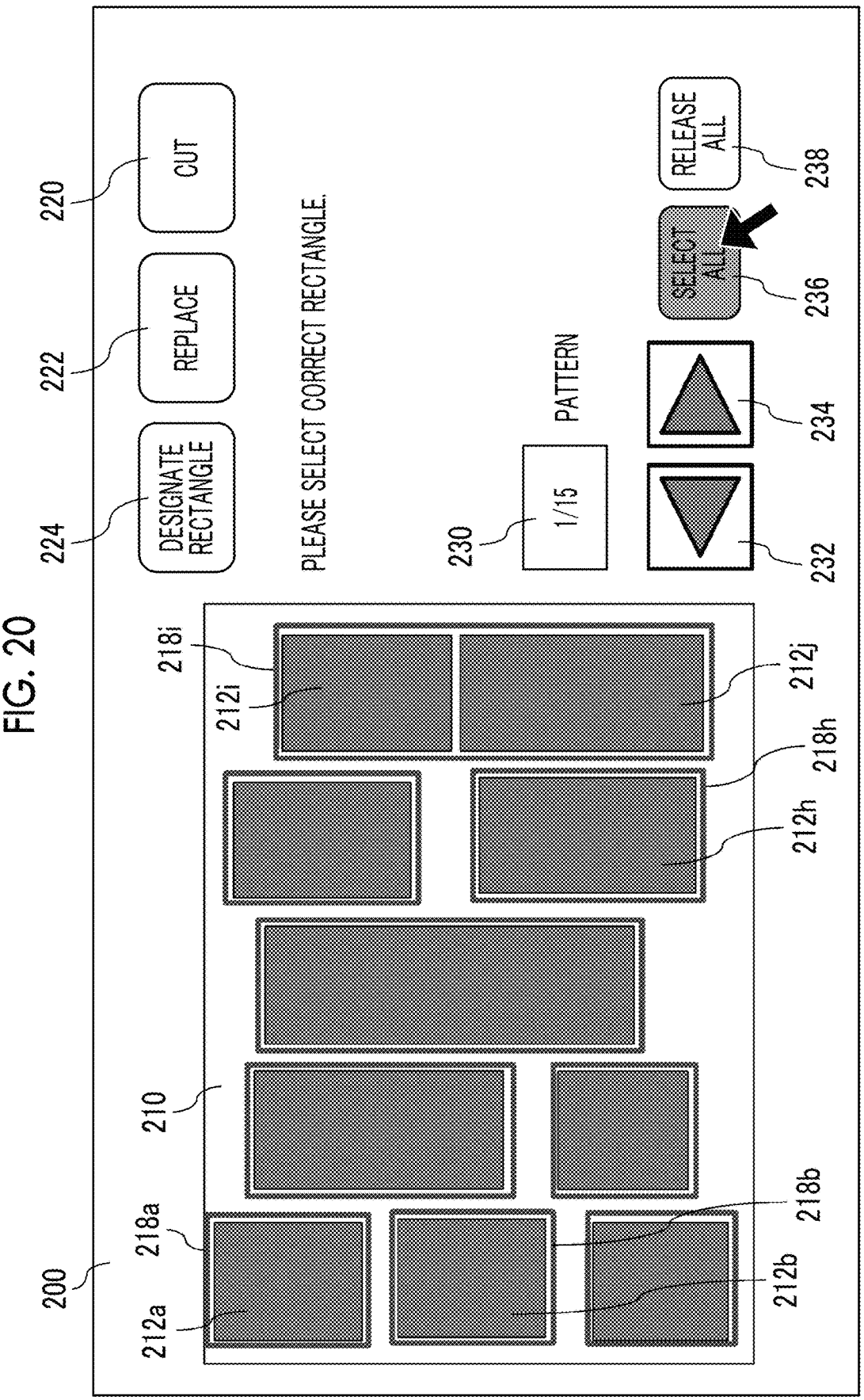
FIG. 20 is a diagram illustrating a UI screen that is displayed when the platen shown in FIG. 19 is scanned.

In the example of FIG. 20, the user visually confirms document areas 218a, 218b, . . . , 218h, and 218i and document images 212a, 212b, . . . , 212i, and 212j of patterns displayed on the UI screen 200. With this, the user knows that the document area 218i is erroneous since the document area 218i covers both of the two document images 212i and 212j. The user also knows that other document areas 218a, 218b, . . . , and 218h are closely fitted to the document images 212a, 212b, . . . , and 212h, respectively, and are correct. Therefore, the user employs the document images 212a, 212b, . . . , and 212h as correct document images, and determines that only the document area 218i should be corrected.

Figure 21:
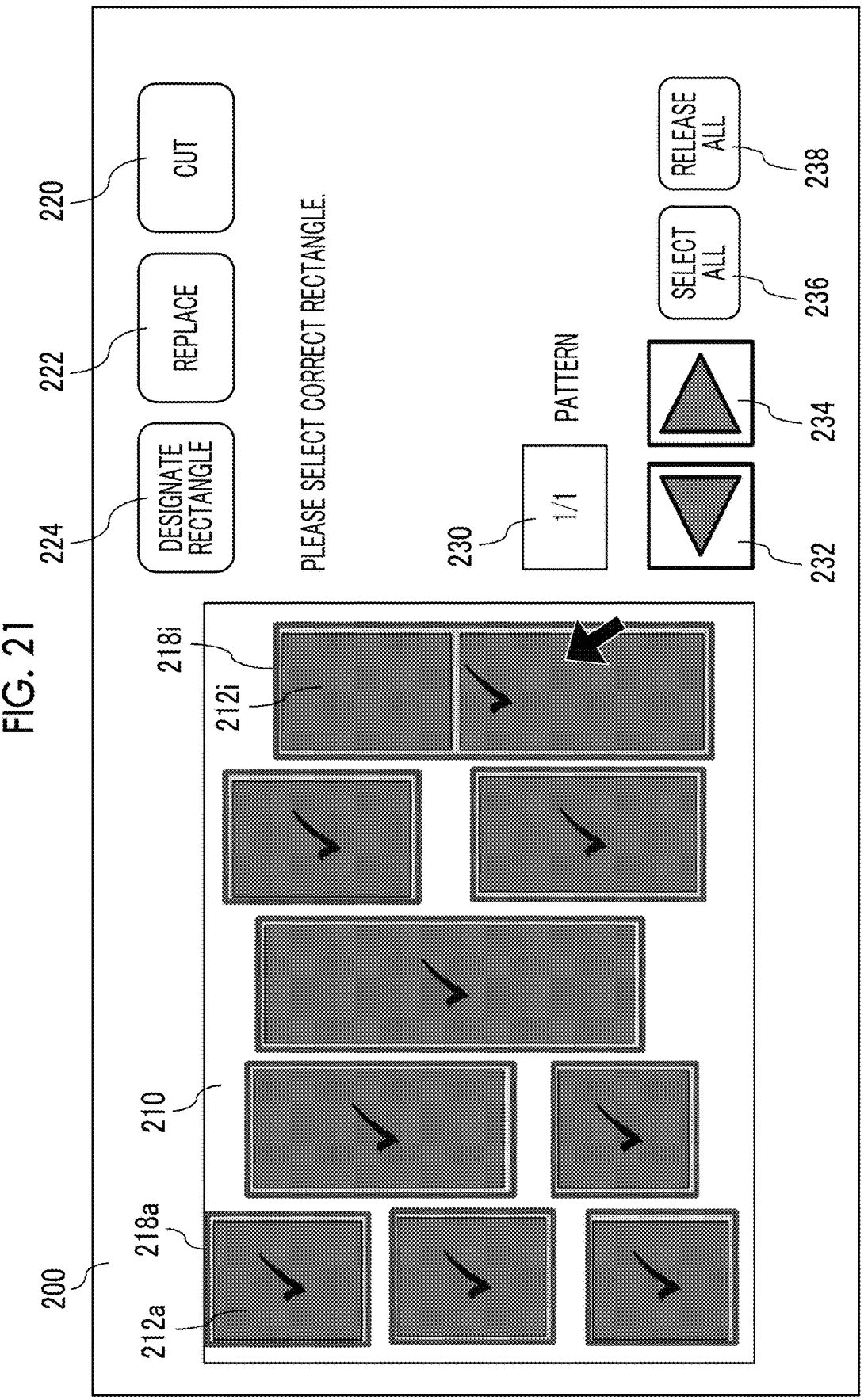
FIG. 21 is a diagram illustrating a UI screen on which all displayed document areas are brought into a selection state with press of a select all button.
Figure 22:
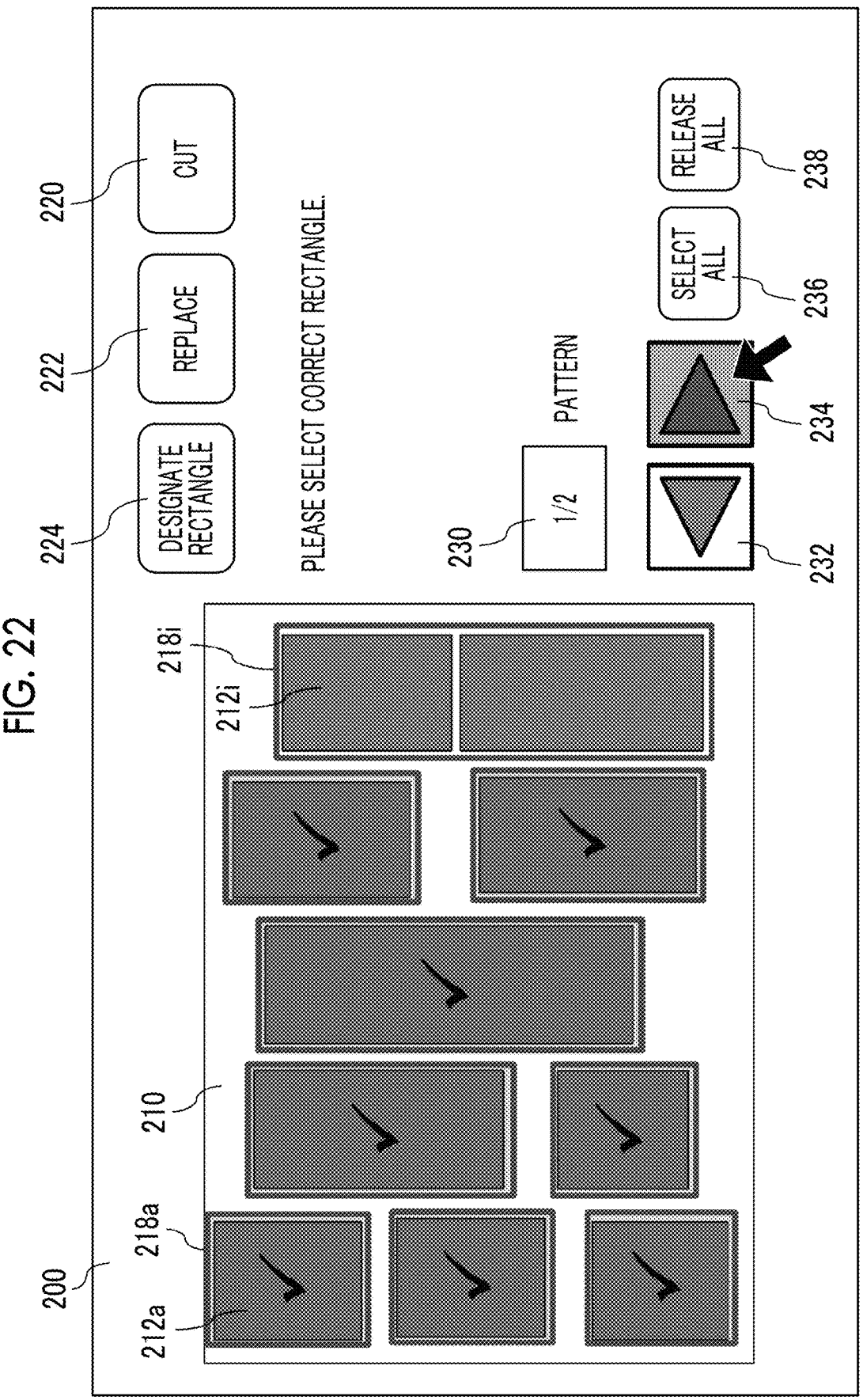
FIG. 22 is a diagram illustrating a UI screen when selection of one of all selected document areas is released.
Figure 23:
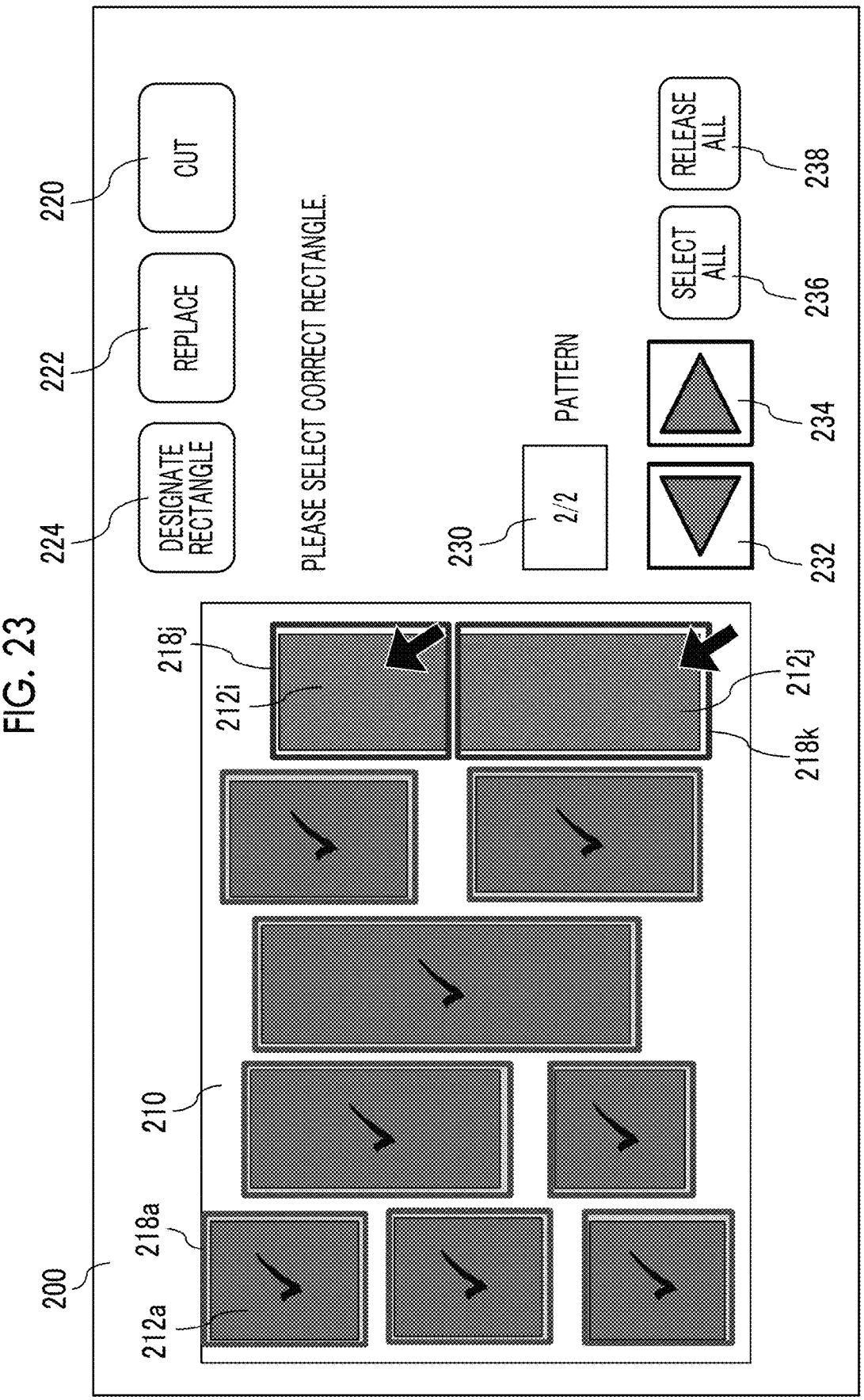
FIG. 23 is a diagram illustrating a UI screen on which another pattern having document areas in a selection state common to FIG. 22 is displayed.
Figure 24:
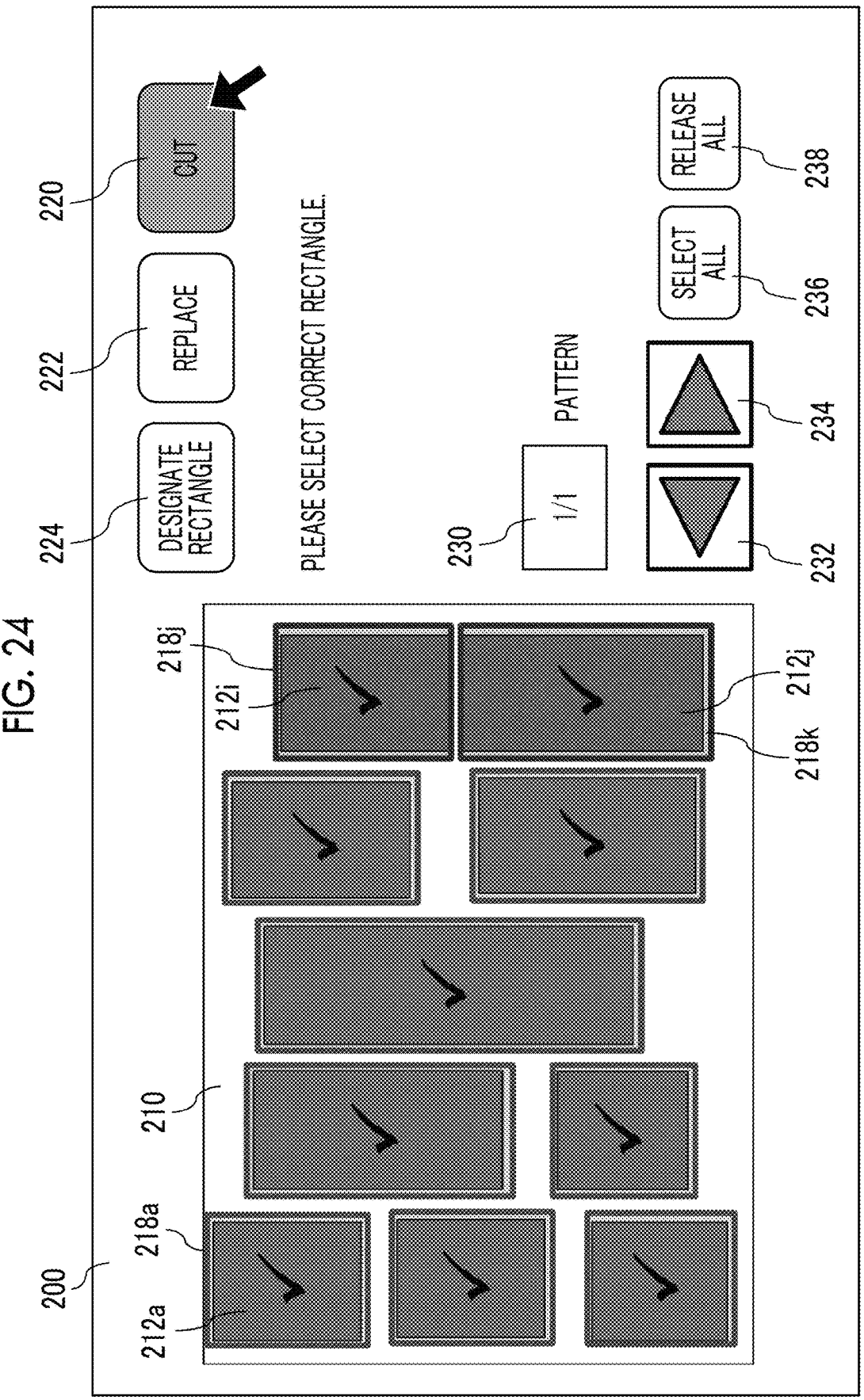
FIG. 24 is a diagram illustrating a UI screen in a state in which two document areas in a nonselection state on the UI screen of FIG. 23 are selected.

Accordingly, the user presses the select all button 236 to select all document areas 218a, 218b, . . . , 218h, and 218i within the displayed pattern once. With this, the UI screen 200 is changed to a UI screen shown in FIG. 21. In this case, the number of switching candidates is one. The user touches the document area 218i on the UI screen 200 to release the selection state of the document area 218i. With this, the UI screen 200 is changed to a UI screen shown in FIG. 22. The document area 218i is brought into the nonselection state, whereby the number of switching candidates increases to two. The user presses the next candidate button 234 in order to confirm the pattern of another switching candidate. With this, the UI screen 200 is changed to a UI screen shown in FIG. 23. A pattern displayed on the UI screen 200 shown in FIG. 23 includes a document area 218j that is closely fitted to the document image 212i, and a document area 218k that is closely fitted to the document image 212j. In a case where the user selects the two document areas 218j and 218k, the UI screen 200 is changed to a UI screen shown in FIG. 24. In a case where the user presses the cut button 220 on the UI screen 200, the processor 102 cuts an image within each of the document areas 218a, 218b, . . . , 218h, 218j, and 218k in the selection state and outputs each image to a file.

In the example described referring to FIGS. 19 to 24, although the number of erroneous document areas is only one, in a case where there are a plurality of erroneous document areas among the document areas in the selection state, all erroneous document areas may be selected. In this case, the processor 102 sets a portion including a plurality of selected document areas in a scanned image 210 as an undetermined portion. Alternatively, the processor 102 may set a remaining portion excluding "a document area group remaining in the selection state (that is, correct) after the selection of the erroneous document areas" from the scanned image as an undetermined portion. Then, the processor 102 receives designation of document areas within the undetermined portion from the user. For example, the processor 102 presents the patterns including the document image group remaining in the selection state among the patterns extracted in S14 to the user as switching candidates and receives selection of the user from the switching candidates. In this case, while the document areas within the undetermined portion are different among the switching candidates presented to the user, the document areas in the selection state are common among the switching candidates presented to the user. In this case, the document areas that are displayed within the undetermined portion on the UI screen 200 are included in the patterns (that is, switching candidates) including the document area group in the selection state. However, as another example, the document areas that belong to the patterns not including the document area group in the selection state among the patterns extracted in S14 and are included in the undetermined portion may be displayed on the UI screen 200 as candidates of correct document areas and selection may be received from the user.

When the UI screen 200 is initially displayed, all document areas of the patterns displayed on the UI screen 200 may be brought into the selection state (that is, a state of "select all", and the user may select the erroneous document areas from the state.

Next, a use scene of the replace button 222 and the designate rectangle button 224 is illustrated.

Figure 25:
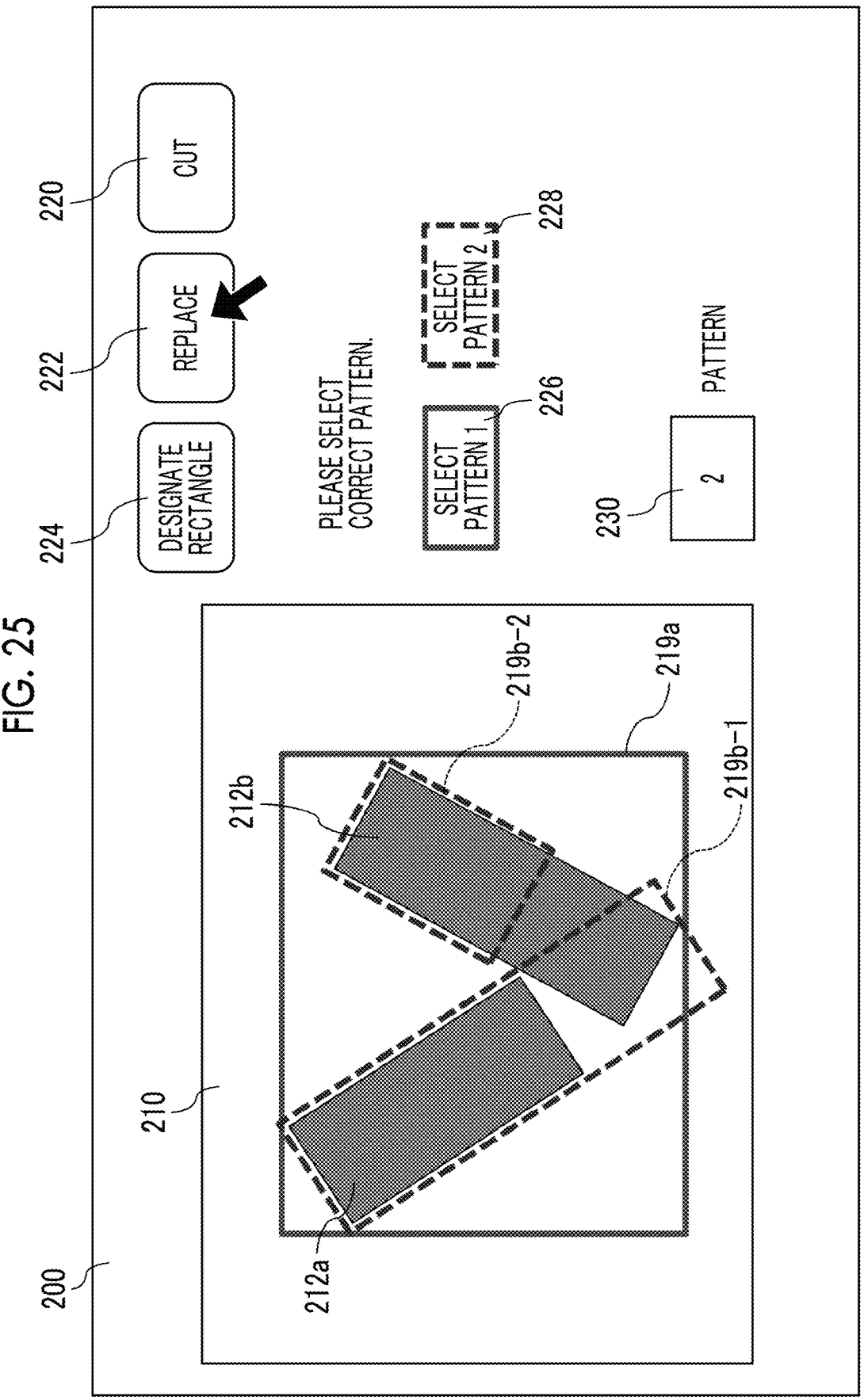
FIG. 25 is a diagram illustrating a UI screen in a case where all extracted document areas are incorrect.

An example of a UI screen 200 shown in FIG. 25 is an example of a case where there is no correct pattern between the patterns of the document areas extracted in S12 and S14. A pattern 1 includes one large rectangular document area 219a including both of two document images 212a and 212b, and a pattern 2 includes a document area 219b-1 that is expanded downward from the document image 212a and a document area 219b-2 that partially covers the document image 212b. Ambiguity of edges of the document images 212a and 212b, density distributions of the images, stain of the platen 10, and the like may be combined, and a document area not fitted to any one of the document images 212*a* and 212*b* may be extracted.

In this example, since the number of extracted patterns is two, the simultaneous display type UI screen 200 is employed, and the "select pattern 1" button 226 and the "select pattern 2" button 228 are displayed within the screen. However, since any patterns are not correct, a correct pattern is not selected even though the buttons are pressed.

In this case, the user performs an operation to press the replace button 222 to replace the document group on the platen 10 or to press the designate rectangle button 224 to directly designate the rectangles, that is, the document areas on the UI screen 200.

Figure 26:
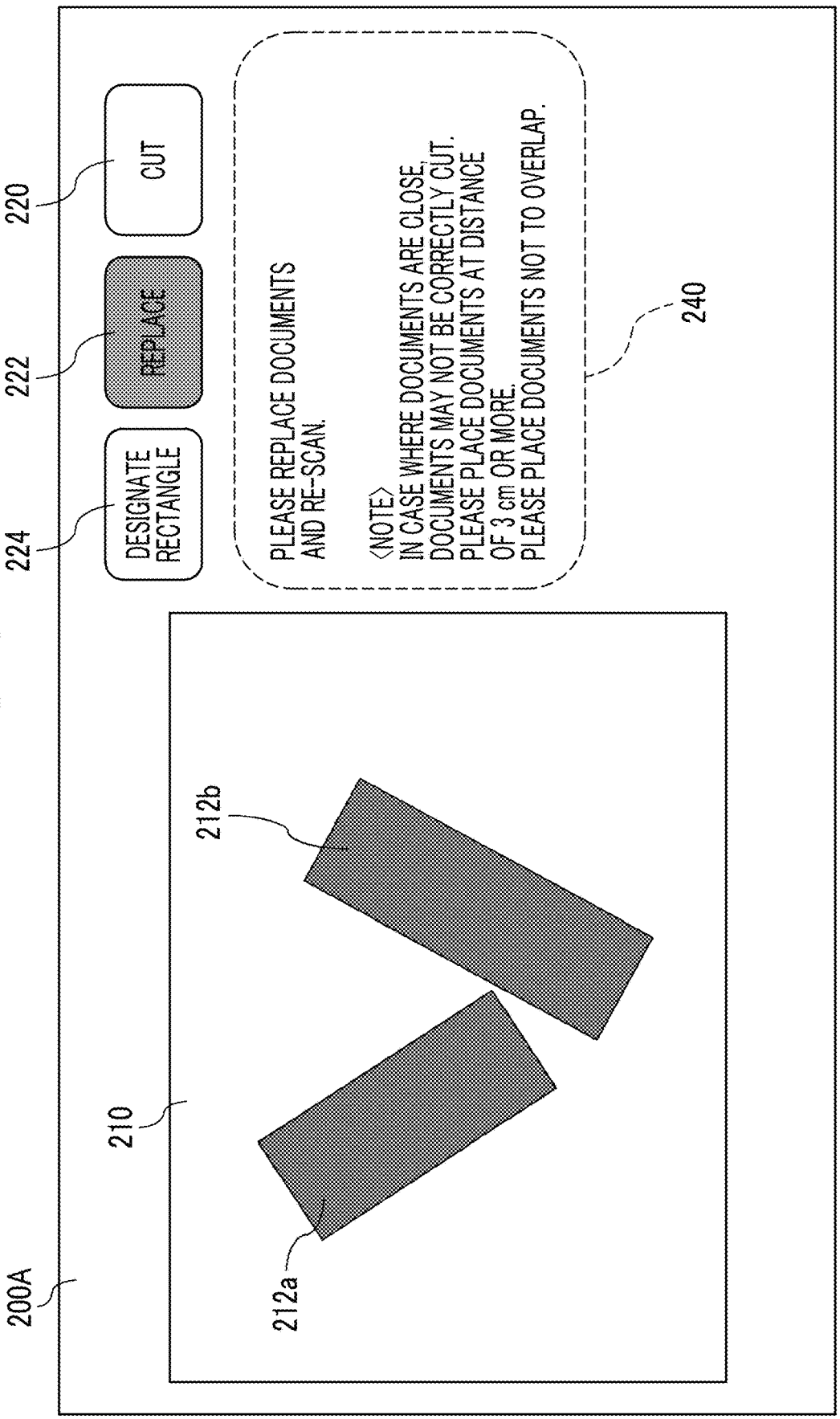
FIG. 26 is a diagram illustrating a UI screen for replacement guidance.

In a case where the user presses the replace button 222, the processor 102 displays a UI screen 200A for replacement guidance illustrated in FIG. 26 (S24 of FIG. 2). On the screen, guidance information 240 is displayed. In the guidance information 240, a message "Please replace documents and re-scan." representing an operation to be performed by the user and statement of a note (for example, the documents should be separated from at a predetermined distance or more) regarding the operation are included. The user replaces the documents on the platen 10 with reference to the guidance information 240 and instructs scanning execution again. In a case where the instruction of scanning execution is received (the determination result of S26 of FIG. 2 is Yes), the processor 102 executes the steps from S10 of FIG. 2 again.

Figure 27:
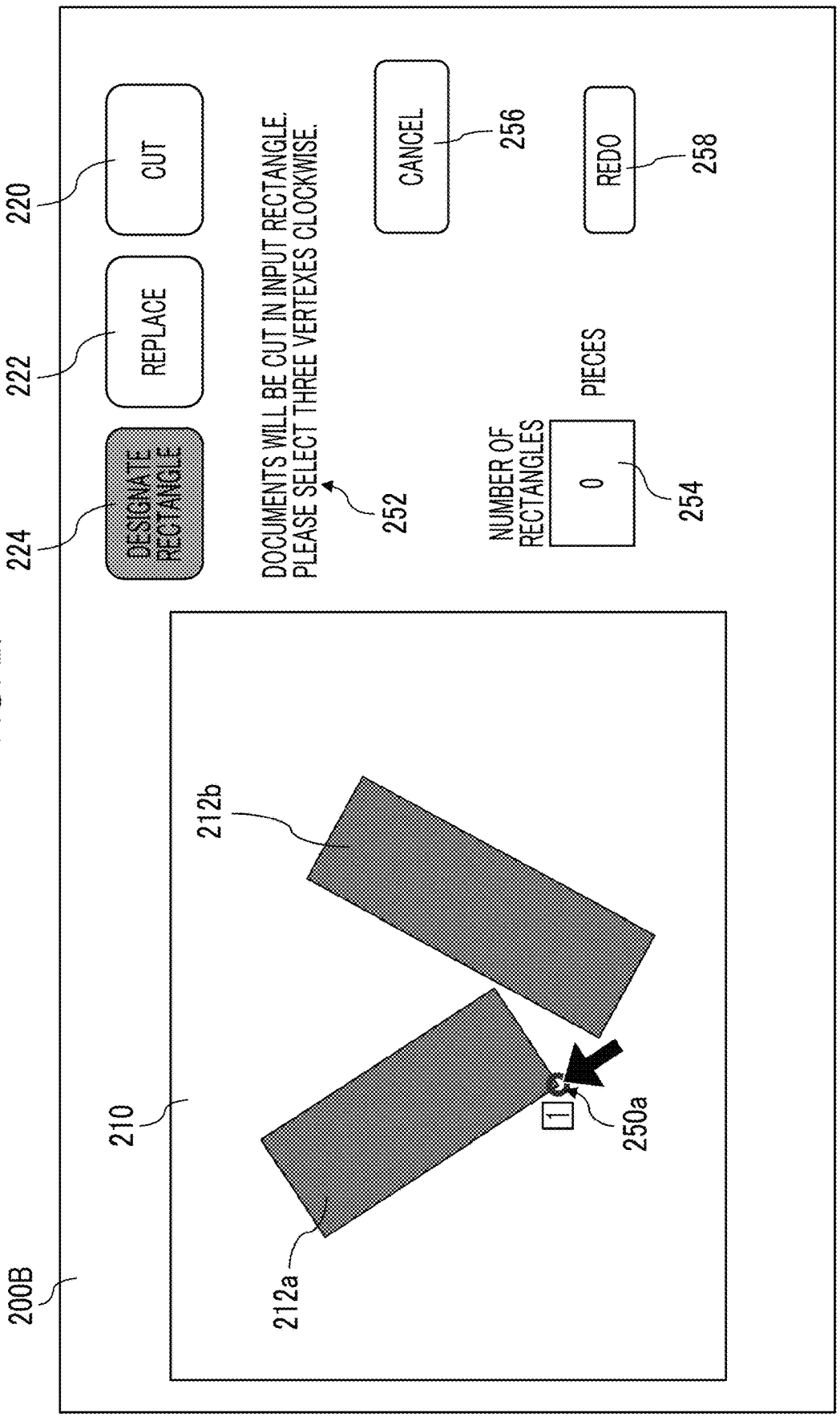
FIG. 27 is a diagram illustrating a UI screen for rectangle designation.
Figure 28:
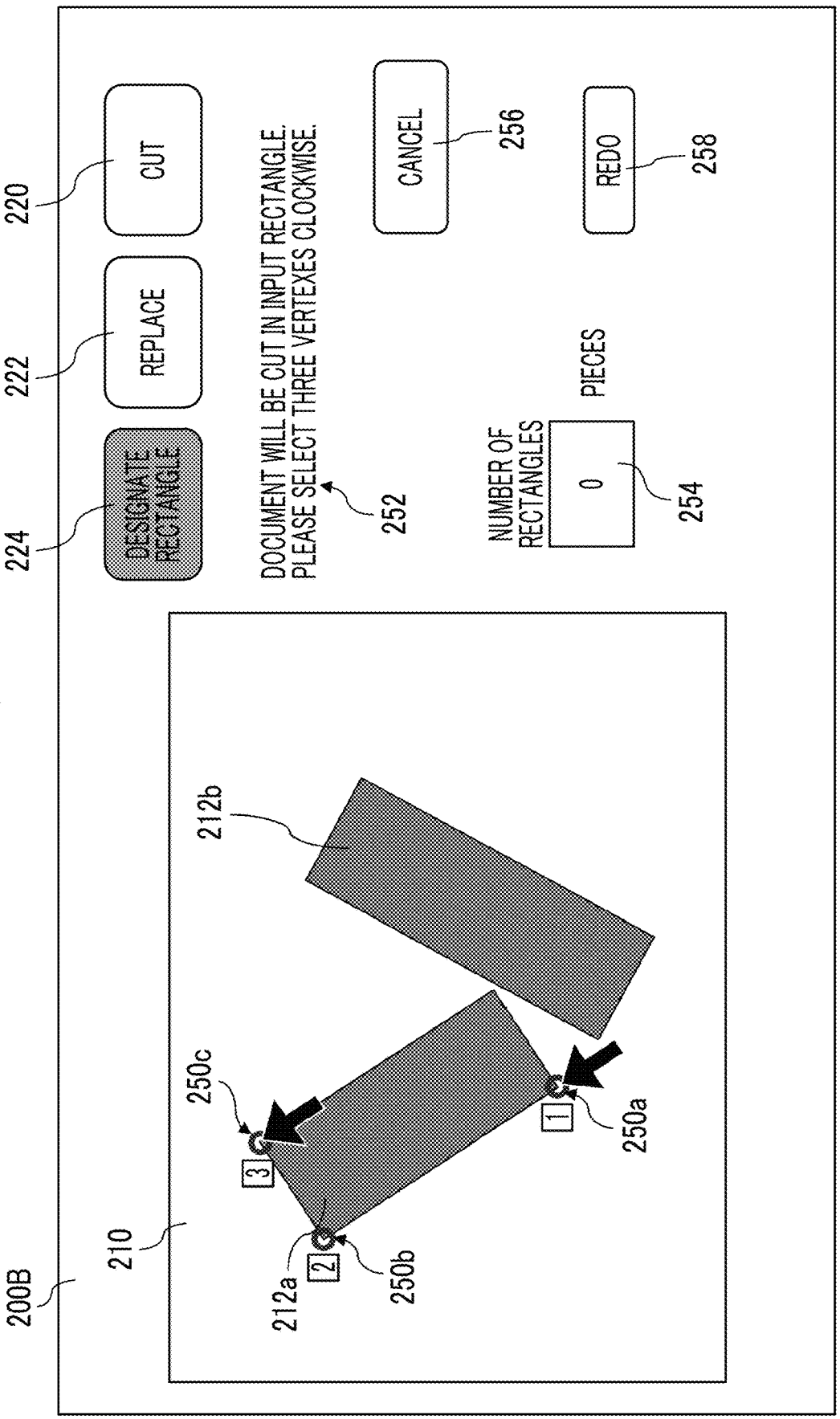
FIG. 28 is a diagram illustrating a state in which three vertexes are selected on the UI screen for rectangle designation.

In a case where the user presses the designate rectangle button 224 on the UI screen 200 illustrated in FIG. 25, the processor 102 displays a UI screen for rectangle designation 200B shown in FIG. 27, receives an operation from the user, and determines the rectangle, that is, the document area according to the operation (S28 of FIG. 2).

Any document area is not displayed on a scanned image 210 within a UI screen 200B displayed immediately after the user presses the designate rectangle button 224. On the UI screen 200B, a description 252 indicating a method of rectangle designation, a number-of-rectangles display field 254, a cancel button 256, and a redo button 258 are displayed. The method of rectangle designation indicated in the description 252 is a method that selects any three among four vertexes of the rectangle clockwise. In the number-of-rectangles display field 254, the number of rectangles (that is, document areas) already determined or selected according to the operation of the user is displayed. When the UI screen 200B of FIG. 27 is displayed, since any rectangle is not determined, the number of rectangles displayed in the number-of-rectangles display field 254 is zero.

The cancel button 256 is a button for an instruction to cancel selection of a vertex of the user. For example, in a case where the user select a second vertex after selecting a first vertex, and immediately presses the cancel button 256, the selection of the second vertex is cancelled, and in a case where the user presses the cancel button 256 once more, the selection of the first vertex is also cancelled. The redo button 258 is a button for clearing the selection of the vertexes on the scanned image 210 and the determination of the document areas accompanied by the selection of the vertexes.

Figure 29:
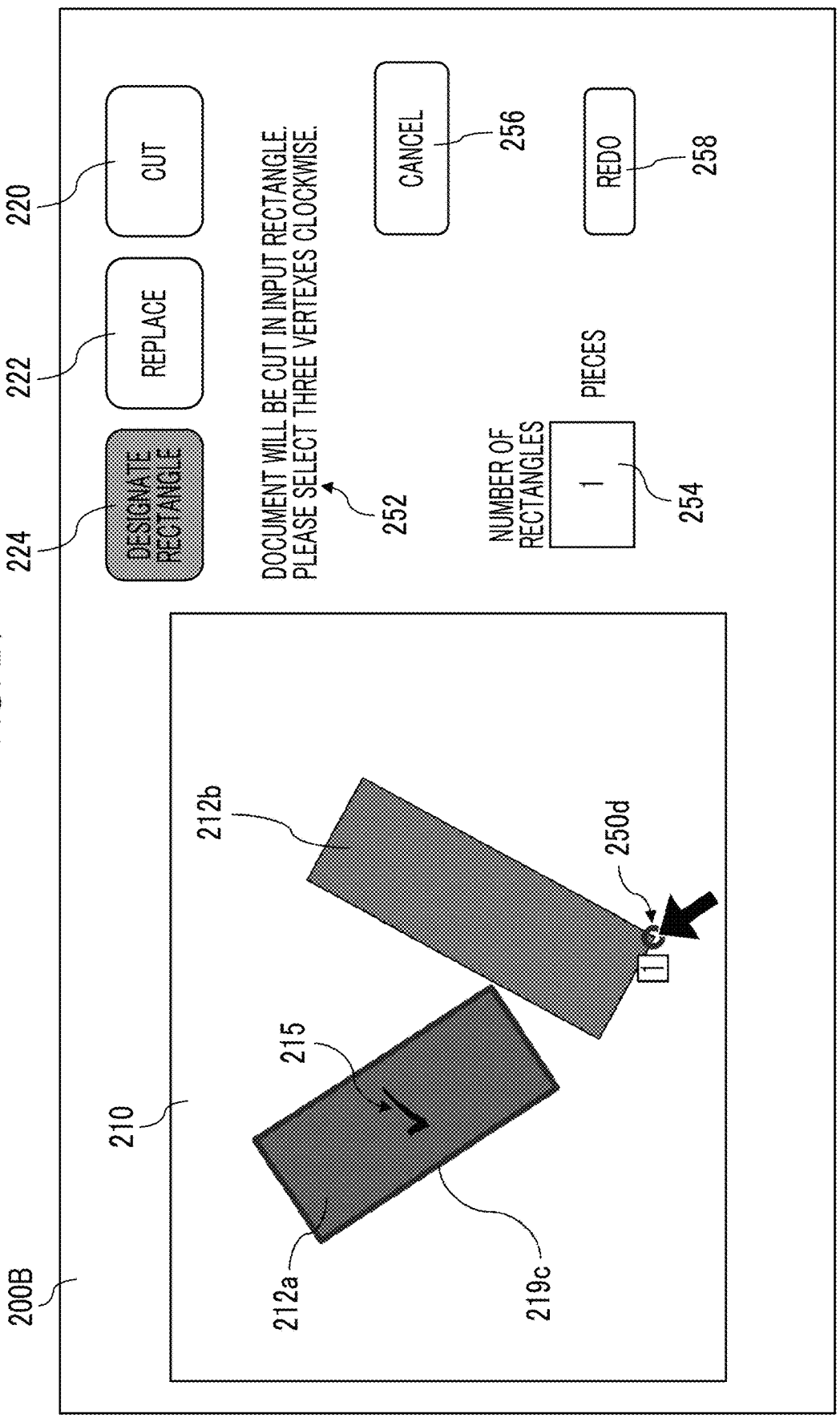
FIG. 29 is a diagram illustrating a state in which one document area is determined on the UI screen for rectangle designation.

The user recognizes the document image 212*a* or 212*b* while viewing the scanned image 210 and selects the vertexes of the rectangle of the recognized document image 212*a* or 212*b* one by one clockwise. The selection is performed, for example, by an operation of the user to touch the vertexes of the document image within the scanned image 210 displayed on the touch panel with the finger. The processor 102 stores the coordinates of the selected vertexes within the scanned image 210 and displays marks (in the drawing, circles) indicating the selected vertexes in the coordinates on the scanned image 210. At the stage displayed in FIG. 27, the user already selects a first vertex 250*a* of the document image 212*a*. Thereafter, the user selects second and third vertexes 250*b* and 250*c* of the document image 212*a* in order clockwise (see FIG. 28). In a case where the number of selected vertexes becomes three, the processor 102 determines a rectangle uniquely specified from the coordinates of the three vertexes as one document area 219*c* as shown in FIG. 29 and stores information regarding the determined document area 219*c* in the memory 104. On the UI screen 200B shown in FIG. 29, the determined document area 219*c* is shown by a frame line, and a check mark 215 indicating that the document area 219*c* is in the selection state (that is, already determined) is also displayed within the area. Thereafter, the user selects three vertexes of the rectangle indicating the second document image 212*b* in order. FIG. 29 shows a state when one vertex 250*d* among the vertexes is selected.

In the above example, although the user selects the three vertexes of the rectangle of the document image to specify the rectangle, this is just an example. Instead, for example, the user may perform an operation to trace two adjacent sides of the document image on the UI screen 200B with the finger, thereby specifying the rectangle of the document image.

The example described referring to FIGS. 25 to 29 is an example of a case where there is no correct document area among the document areas extracted through the document area extraction processing. However, rectangle designation is not limited to such a case, and can be executed at any time. For example, even though the user presses the previous candidate button 232 or the next candidate button 234 to examine all remaining patterns in a state in which the two document areas 216*a* and 216*c* illustrated in FIG. 16 are selected, in a case where a pattern including the document area closely fitted to the document image 212*c* is not found, the rectangle of the document area of the document image 212*c* may be designated through rectangle designation. That is, in this case, the processor 102 recognizes a new document area based on a vertex group selected by the user and adds and stores the document area in the memory 104 while holding information of each document area in the selection state in the memory 104.

As above, the exemplary embodiment of the invention has been described. The above-described exemplary embodiment is just an example. Various modifications or improvements can be made within the scope of the invention. For example, an example where a surface on which a plurality of documents are aligned is imaged by a camera of a smartphone and an application installed on the smartphone executes processing identical to the processing described above on the thus-obtained image is also considered.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a processor configured to
        in a case where there are a plurality of patterns of document areas extracted from an input image obtained by imaging documents, execute display control for displaying the plurality of patterns as options on a screen,
        receive selection of a correct pattern among the plurality of patterns according to the display of the screen through the display control, and
        extract an image of each document area included in the pattern selected by a user from the input image, wherein
    the display control is control for displaying an image displaying a first pattern among the plurality of patterns on the screen, and
    the processor is configured to further receive a selection of one or more correct document areas among document areas included in the first pattern displayed in the image.

2. The information processing apparatus according to claim 1,
    wherein the display control is control for displaying an image simultaneously displaying the plurality of patterns on the screen.

3. The information processing apparatus according to claim 2,
    wherein the image simultaneously displaying the plurality of patterns further displays,
    in association with each of the plurality of patterns, a UI component for selecting the pattern, and
    in the processing for receiving the selection, the pattern corresponding to the UI component selected by the user in the image simultaneously displaying the plurality of patterns on the screen is determined as the correct pattern.

4. The information processing apparatus according to claim 3,
    wherein the processor is configured to, in a case where the number of patterns of the document areas extracted from the input image is greater than a predetermined threshold value, execute display control different from the control for displaying the image simultaneously displaying the plurality of patterns on the screen.

5. The information processing apparatus according to claim 4,
    wherein
    the processor is configured to further
    execute second reception processing for receiving designation of a document area included in a portion excluding the one or more selected correct document areas in the input image with a method different from a method of selecting the one or more correct document areas from the first pattern, and
    extract an image of each of the one or more selected correct document areas and an image of each document area designated by the different method from the input image.

6. The information processing apparatus according to claim 3,
    wherein
    the processor is configured to further
    execute second reception processing for receiving designation of a document area included in a portion excluding the one or more selected correct document areas in the input image with a method different from a method of selecting the one or more correct document areas from the first pattern, and
    extract an image of each of the one or more selected correct document areas and an image of each document area designated by the different method from the input image.

7. The information processing apparatus according to claim 6,
    wherein the second reception processing is processing for receiving selection of a correct pattern from among patterns including the one or more selected correct document areas among the plurality of patterns.

8. The information processing apparatus according to claim 2,
    wherein the processor is configured to, in a case where the number of patterns of the document areas extracted from the input image is greater than a predetermined threshold value, execute display control different from the control for displaying the image simultaneously displaying the plurality of patterns on the screen.

9. The information processing apparatus according to claim 8,
    wherein
    the processor is configured to further
    execute second reception processing for receiving designation of a document area included in a portion excluding the one or more selected correct document areas in the input image with a method different from a method of selecting the one or more correct document areas from the first pattern, and
    extract an image of each of the one or more selected correct document areas and an image of each document area designated by the different method from the input image.

10. The information processing apparatus according to claim 9,
    wherein the second reception processing is processing for receiving selection of a correct pattern from among patterns including the one or more selected correct document areas among the plurality of patterns.

11. The information processing apparatus according to claim 2,
    wherein
    the processor is configured to further
    execute second reception processing for receiving designation of a document area included in a portion excluding the one or more selected correct document areas in the input image with a method different from a method of selecting the one or more correct document areas from the first pattern, and
    extract an image of each of the one or more selected correct document areas and an image of each document area designated by the different method from the input image.

12. The information processing apparatus according to claim 11,
    wherein the second reception processing is processing for receiving selection of a correct pattern frons among patterns including the one or more selected correct document areas among the plurality of patterns.

13. The information processing apparatus according to claim 1,
    wherein
    the processor is configured to further execute second reception processing for receiving designation of a document area included in a portion excluding the one or more selected correct document areas in the input image with a method different from a method of selecting the one or more correct document areas from the first pattern, and extract an image of each of the one or more selected correct document areas and an image of each document area designated by the different method from the input image.

14. The information processing apparatus according to claim 13, wherein the second reception processing is processing for receiving selection of a correct pattern from among patterns including the one or more selected correct document areas among the plurality of patterns.

15. The information processing apparatus according to claim 14, wherein, in the second reception processing, in a case where the number of patterns including the one or more selected correct document areas is equal to or less than a predetermined threshold value, an image that simultaneously displays the patterns including the one or more correct document areas and displays, in association with each of the simultaneously displayed patterns, a UI component for selecting the pattern is displayed on the screen, and the pattern corresponding to the UI component selected by the user in the image simultaneously displaying the patterns on the screen is determined as the correct pattern.

16. The information processing apparatus according to claim 13, wherein, in the second reception processing, designation of vertexes or sides for specifying a document area included in a portion excluding the one or more selected correct document areas is received.

17. The information processing apparatus according to claim 1, wherein the processor is configured to further receive selection of one or more erroneous document areas among document areas included in the first pattern displayed in the image, execute second reception processing for receiving designation of a document area included in a portion corresponding to the one or more selected erroneous document areas in the input image with a method different from a method of selecting the one or more erroneous document areas from the first pattern, and extract an image of each of remaining document areas excluding the one or more erroneous document areas in the first pattern and an image of each document area designated by the different method from the input image.

18. The information processing apparatus according to claim 17, wherein the second reception processing is processing for receiving selection of a correct pattern from among patterns including each of remaining document areas excluding the one or more selected erroneous document areas among the plurality of patterns.

19. The information processing apparatus according to claim 1, wherein the processor is configured to receive designation of vertexes or sides for specifying at least one document area included in the input image displayed on the screen, and extract an image of the at least one document area specified by the designated vertexes or sides from the input image.

20. A non-transitory computer readable medium storing a program causing a computer to operate to in a case where there are a plurality of patterns of document areas extracted from an input image obtained by imaging documents, execute display control for displaying the plurality of patterns as options on a screen, receive selection of a correct pattern among the plurality of patterns according to the display of the screen through the display control, wherein the display control is control for displaying an image displaying a first pattern among the plurality of patterns on the screen, extract an image of each document area included in the pattern selected by a user from the input image, and receive a selection of one or more correct document areas among document areas included in the first pattern displayed in the image.

* * * * *